(12) United States Patent
Sakamoto et al.

(10) Patent No.: US 10,336,163 B2
(45) Date of Patent: Jul. 2, 2019

(54) WINDSHIELD

(71) Applicant: NIPPON SHEET GLASS COMPANY, LIMITED, Tokyo (JP)

(72) Inventors: Takumitsu Sakamoto, Tokyo (JP); Satoshi Kanki, Tokyo (JP); Hideaki Oshima, Tokyo (JP); Hisashi Ogawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 122 days.

(21) Appl. No.: 15/125,864

(22) PCT Filed: Mar. 16, 2015

(86) PCT No.: PCT/JP2015/057778
§ 371 (c)(1),
(2) Date: Sep. 13, 2016

(87) PCT Pub. No.: WO2015/137518
PCT Pub. Date: Sep. 17, 2015

(65) Prior Publication Data
US 2017/0015180 A1     Jan. 19, 2017

(30) Foreign Application Priority Data

Mar. 14, 2014   (JP) ................................. 2014-052795
Mar. 14, 2014   (JP) ................................. 2014-052796

(51) Int. Cl.
*B32B 3/02*     (2006.01)
*B60J 3/00*     (2006.01)
(Continued)

(52) U.S. Cl.
CPC ......... *B60J 3/007* (2013.01); *B32B 17/10036* (2013.01); *B32B 17/10348* (2013.01);
(Continued)

(58) Field of Classification Search
CPC .. B60J 3/007; B60J 1/02; B60R 11/04; G06K 9/00798; G06K 9/00791
See application file for complete search history.

(56) References Cited

U.S. PATENT DOCUMENTS

2003/0150848 A1   8/2003   Noguchi et al.
2009/0257141 A1   10/2009   Yamada et al.
(Continued)

FOREIGN PATENT DOCUMENTS

CN       201808255 U    4/2011
DE   102007042028 A1   3/2009
(Continued)

OTHER PUBLICATIONS

International Search Report, issued in PCT/JP2015/057778 (PCT/ISA/210), dated Jun. 2, 2015.
(Continued)

*Primary Examiner* — Elizabeth E Mulvaney
(74) *Attorney, Agent, or Firm* — Birch, Stewart, Kolasch & Birch LLP

(57) ABSTRACT

A windshield according to the present invention is a windshield to which an information acquisition device that emits and/or receives light to acquire information from an outside of a vehicle can be attached, and that includes a glass sheet, and a mask layer that is formed on the glass sheet and blocks a visual field from the outside of the vehicle, and at least one opening is formed in the mask layer. The glass sheet and the mask layer have different heat shrinkage percentages and are molded together by being heated. The information acquisition device is configured to be capable of using the information while reducing an influence of distortion that occurs in a predetermined range from an inner peripheral edge of the opening toward a center of the opening due to the molding.

16 Claims, 21 Drawing Sheets

(51) Int. Cl.

| | | |
|---|---|---|
| *B60J 1/02* | (2006.01) | |
| *G02B 5/00* | (2006.01) | |
| *G06K 9/00* | (2006.01) | |
| *B60R 11/04* | (2006.01) | |
| *B32B 17/10* | (2006.01) | |
| *B60R 11/00* | (2006.01) | |

(52) U.S. Cl.
CPC ........... *B32B 17/10761* (2013.01); *B60J 1/02* (2013.01); *B60R 11/04* (2013.01); *G02B 5/003* (2013.01); *G06K 9/00791* (2013.01); *B32B 2250/03* (2013.01); *B60R 2011/0026* (2013.01)

(56) References Cited

U.S. PATENT DOCUMENTS

| | | | |
|---|---|---|---|
| 2011/0027515 A1 | 2/2011 | Melcher et al. | |
| 2011/0192678 A1* | 8/2011 | Matsuda | B32B 17/10761 181/286 |
| 2011/0281095 A1* | 11/2011 | Timmermann | B32B 17/10036 428/215 |

FOREIGN PATENT DOCUMENTS

| | | |
|---|---|---|
| EP | 1331089 A1 | 7/2003 |
| JP | 62-185153 A | 8/1987 |
| JP | 2003-211956 A | 7/2003 |
| JP | 2006-96331 A | 4/2006 |
| JP | 2006-327381 A | 12/2006 |
| JP | 2010-70414 A | 4/2010 |
| JP | 2011-502090 A | 1/2011 |
| JP | 2012-524690 A | 10/2012 |
| WO | WO 2007/052600 A1 | 5/2007 |

OTHER PUBLICATIONS

Written Opinion of the International Searching Authority, issued in PCT/JP2015/057778 (PCT/ISA/237), dated Jun. 2, 2015.
Extended European Search Report for European Application No. 15761431.4, dated Oct. 25, 2017.
Chinese Office Action and Search Report dated Nov. 30, 2017, for corresponding Chinese Application No. 201580014195.8, with an English translation of the Chinese Office Action.
Office Action issued in Japanese Patent Application No. 2016-507867 dated Mar. 12, 2019.

* cited by examiner (a)

(b)

(c)

(d)

Boundary of opening

Distortion  Distortion

WINDSHIELD

TECHNICAL FIELD

The present invention relates to an automobile windshield.

BACKGROUND ART

In recent years, safety performance of automobiles has dramatically improved. In order to avoid a collision with a preceding vehicle, for example, a safety system is proposed in which the distance to the preceding vehicle and the speed of the preceding vehicle are detected and a brake automatically engages in an abnormal approach to the preceding vehicle. In such a system, the distance to the preceding vehicle and the like are measured using a laser radar or a camera. In general, the laser radar or the camera is arranged on the inner side of a windshield, and the measurements are performed by emitting infrared rays ahead.

Incidentally, a measurement device such as the laser radar or the camera as mentioned above is often attached to the inner surface of a glass sheet included in the windshield. In order to conceal such a measurement apparatus from the outside, a mask layer is formed on the inner surface of the glass sheet by applying dark-colored ceramic, and the measurement device is arranged on the mask layer. At this time, an opening is formed in the mask layer, and a laser beam emitted and received by the laser radar, visible light and/or infrared rays received by the camera, and the like are emitted and received through this opening.

CITATION LIST

Patent Literature

Patent Literature 1: JP 2006-327381A

SUMMARY OF INVENTION

Technical Problem

The inventors of the invention found that when the measurement device is arranged on the mask layer as mentioned above, a problem as described below may arise. The windshield as mentioned above is manufactured by heating a glass sheet to which a mask layer has been applied and molding it into a curved shape. At this time, the mask layer has a dark color such as black and thus absorbs a larger amount of heat in the glass sheet compared with the region in which the mask layer is not formed. Here, since the thermal expansion coefficient of the mask layer made of ceramic is different from that of the glass sheet, the amount of expansion caused by heat absorption is different. Therefore, it was found that as shown in FIG. 30, due to the difference in the expansion amount, a problem arises in that distortion occurs near the boundary between the mask layer and the region in which the mask layer is not formed, resulting in distortion of an image seen through the glass sheet, for example. It was found that this problem may cause a problem as described below in a windshield provided with the safety system as mentioned above. That is, if such distortion occurs near the boundary between the mask layer and an opening, when a laser beam is emitted and received or when imaging is performed using the camera, there is a risk that light cannot be accurately emitted or received due to light being refracted by the distortion. Accordingly, there is also a risk that the distance between vehicles and the like are not accurately calculated.

Such a problem may arise not only in devices for measuring a distance between vehicles but also in information acquisition devices in general that acquire information from the outside of a vehicle by receiving light emitted by optical beacons, for example. Therefore, the present invention was made in order to solve the foregoing problems, and it is an object thereof to provide a windshield to which an information acquisition device that emits and/or receives light through the opening of the mask layer can be attached, and that enables accurate information processing.

Solution to Problem

Invention A

A windshield according to the present invention is a windshield to which an information acquisition device that emits and/or receives light to acquire information from an outside of a vehicle can be attached, the windshield including a glass sheet, and a mask layer that is formed on the glass sheet and blocks a visual field from the outside of the vehicle, at least one opening being formed in the mask layer, wherein the glass sheet and the mask layer have different heat shrinkage percentages and are molded together by being heated, and the information acquisition device is configured such that the information can be used such that an influence of distortion is reduced, the distortion occurring in a predetermined range from an inner peripheral edge of the opening toward a center of the opening due to the molding.

Invention B

The present invention is a windshield on which an information acquisition device that emits and/or receives light to acquire information from an outside of a vehicle can be arranged, the windshield including a glass sheet on which a mask layer that blocks a visual field from the outside of the vehicle is laminated, at least one opening being formed in the mask layer, wherein the glass sheet and the mask layer have different heat shrinkage percentages and are molded together by being heated, a passage range of the light to be emitted and/or to be received is configured so as to pass through a range near a center of the opening, and the information acquisition device is arranged on a surface of the glass sheet on a vehicle interior side so as to be capable of acquiring the information through the opening.

In the windshield, the passage range of the light can be spaced apart from the peripheral edge of the opening by at least 4 mm.

In the windshield, at least a portion of the mask layer can be made black.

In the windshield, an electromagnetic wave blocking film can be formed in at least a portion of a region to which the information acquisition device is to be attached in at least a portion of the mask layer and a region in which distortion occurs.

In the windshield, at least a portion of the mask layer and the region in which distortion occurs can be configured by arranging a first visual field blocking film, the electromagnetic wave blocking film, and a second visual field blocking film in this order from a vehicle exterior side to a vehicle interior side.

The windshield can further include a cover for covering the information acquisition device from a vehicle interior side, and a second electromagnetic wave blocking film can be formed on a surface of the cover that is opposite to the information acquisition device.

Invention C

A windshield according to the present invention includes a glass sheet on which a mask layer that blocks a visual field from an outside of a vehicle is laminated, at least one opening being formed in the mask layer, an imaging device that is arranged on a surface of the glass sheet on a vehicle interior side so as to be capable of taking an image of the outside of the vehicle through the opening, and an image processing device that processes the image taken by the imaging device, wherein the glass sheet and the mask layer have different heat shrinkage percentages and are molded together by being heated, and the image processing device is configured to analyze the image taken by the imaging device through the opening without using a region corresponding to a range of a predetermined length from a peripheral edge of the opening toward a center of the opening.

In the windshield, the region can be set to be a region corresponding to a range of 4 mm or more from the peripheral edge of the opening toward the center of the opening. At this time, the image processing device can be configured to trim off the region from the image and analyze the image subjected to the trimming.

In the windshield, the mask layer can be made black.

In the windshield, the glass sheet can include an outer glass sheet, an inner glass sheet that is arranged opposite to the outer glass sheet, and an interlayer arranged between the outer glass sheet and the inner glass sheet.

In the windshield, the interlayer can include a core layer, and a pair of outer layers that have a higher hardness than that of the core layer and between which the core layer is sandwiched.

The Young's modulus of the core layer can be set to 1 to 20 MPa at a frequency of 100 Hz and a temperature of 20° C., for example.

The Young's modulus of each of the outer layers can be set to 560 MPa or more at a frequency of 100 Hz and a temperature of 20° C., for example.

In the windshield, an electromagnetic wave blocking film can be formed in at least a portion of a region to which the imaging device is to be attached in the mask layer.

In the windshield, at least a portion of the mask layer can be configured by arranging a first visual field blocking film, the electromagnetic wave blocking film, and a second visual field blocking film in this order from a vehicle exterior side to a vehicle interior side.

With the present invention, a windshield to which an information acquisition device that emits and/or receives light through an opening of a mask layer can be attached enables accurate information processing.

DESCRIPTION OF EMBODIMENTS

Hereinafter, embodiments of a windshield according to the present invention will be described.

A. First Embodiment

Figure 1:
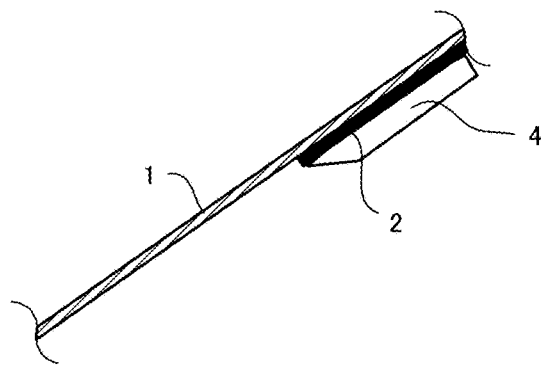
FIG. 1 is a cross-sectional view of an embodiment of a windshield according to the present invention.
Figure 2:
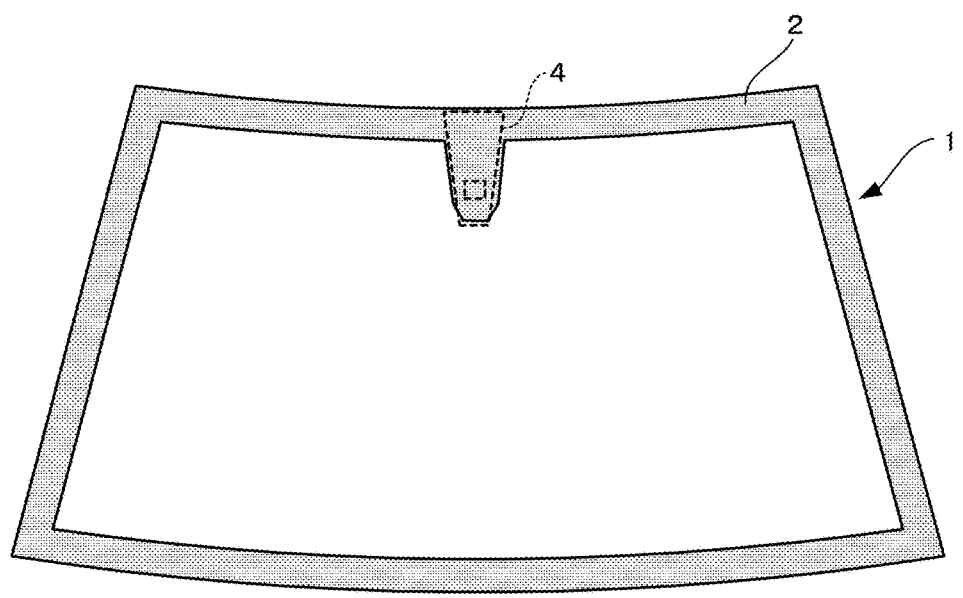
FIG. 2 is a plan view of FIG. 1.

A first embodiment that is an embodiment of the windshield according to the present invention to which a measurement unit for measuring a distance between vehicles is attached will be described with reference to the drawings. FIG. 1 is a cross-sectional view of the windshield according to this embodiment, and FIG. 2 is a plan view of FIG. 1. As shown in FIG. 1 and FIG. 2, the windshield according to this embodiment includes a glass sheet 1, and a mask layer 2 that is formed on a surface of the glass sheet 1 on a vehicle interior side, and a measurement unit 4 for measuring a distance between vehicles is attached to the mask layer 2. The individual members will be described below.

1. Glass Sheet 1-1. Outline of Glass Sheet

Figure 3:
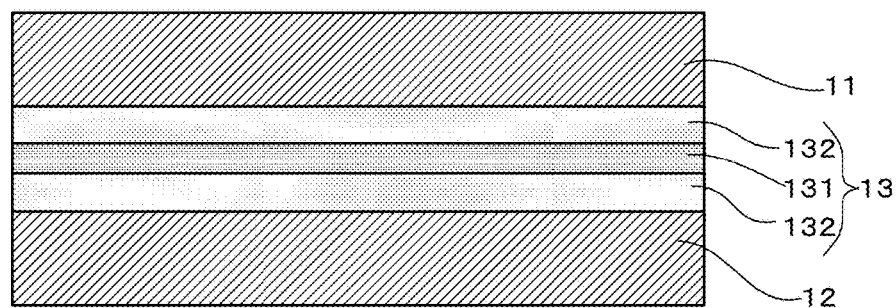
FIG. 3 is a cross-sectional view of a laminated glass.

The glass sheet 1 can be variously configured, and can be constituted by a laminated glass including a plurality of glass sheets or by a single glass sheet, for example. In the case of using a laminated glass, the laminated glass can be configured as shown in FIG. 3, for example. FIG. 3 is a cross-sectional view of a laminated glass.

As shown in this diagram, this laminated glass includes an outer glass sheet 11 and an inner glass sheet 12, and a resin interlayer 13 is arranged between the glass sheets 11 and 12. First, the outer glass sheet 11 and the inner glass sheet 12 will be described. Known glass sheets can be used as the outer glass sheet 11 and the inner glass sheet 12, and these glass sheets can also be made of heat-ray absorbing glass, regular clear glass or green glass, or UV green glass. However, the glass sheets 11 and 12 are required to attain a visible light transmittance that conforms to the safety standards of a country in which the automobile is to be used. For example, an adjustment can be made so that the outer glass sheet 11 ensures a required solar absorptance and the inner glass sheet 12 provides a visible light transmittance that meets the safety standards. An example of the composition of clear glass and an example of the composition of heat-ray absorbing glass are shown below.

Clear Glass
$SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide (T-$Fe_2O_3$) in terms of $Fe_2O_3$: 0.08 to 0.14 mass %

Heat-Ray Absorbing Glass
With regard to the composition of heat-ray absorbing glass, a composition obtained based on the composition of clear glass by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass % and reducing the components (mainly $SiO_2$ and $Al_2O_3$) forming the framework of glass by an amount corresponding to the increases in T-$Fe_2O_3$, $CeO_2$, and $TiO_2$ can be used, for example.

Although there is no particular limitation on the thickness of the laminated glass according to this embodiment, the total thickness of the outer glass sheet 11 and the inner glass sheet 12 is preferably set to 2.4 to 3.8 mm, more preferably 2.6 to 3.4 mm, and particularly preferably 2.7 to 3.2 mm, from the viewpoint of weight reduction. As described above, there is a need to reduce the total thickness of the outer glass sheet 11 and the inner glass sheet 12 in order to reduce the weight. Therefore, although there is no particular limitation on the thicknesses of the glass sheets, the thicknesses of the outer glass sheet 11 and the inner glass sheet 12 can be determined as described below, for example.

The outer glass sheet 11 is mainly required to have durability and impact resistance against external interference. For example, when this laminated glass is used as a windshield of an automobile, the impact-resistance performance with respect to flying objects such as small stones is required. On the other hand, a larger thickness is not preferable because the weight increases. From this viewpoint, the thickness of the outer glass sheet 11 is preferably 1.8 to 2.3 mm, and more preferably 1.9 to 2.1 mm. It is possible to determine which thickness is to be used in accordance with the application of the glass sheet.

Although the thickness of the inner glass sheet 12 can be made to be equal to that of the outer glass sheet 11, the thickness of the inner glass sheet 12 can be made to be smaller than that of the outer glass sheet 11 in order to reduce the weight of the laminated glass, for example. Specifically, when the strength of the glass sheet is taken into consideration, the thickness is preferably 0.6 to 2.0 mm, more preferably 0.8 to 1.6 mm, and particularly preferably 1.0 to 1.4 mm. Furthermore, the thickness is preferably 0.8 to 1.3 mm. With regard to the inner glass sheet 12 as well, it is possible to determine which thickness is to be used in accordance with the application of the glass sheet.

Figure 4:
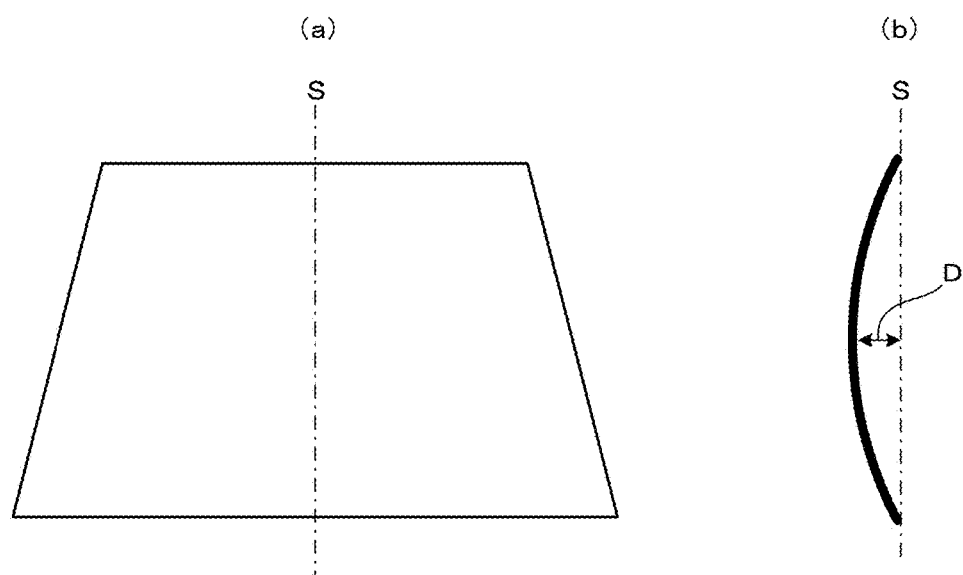
FIGS. 4A and 4B are a front view and a cross-sectional view, respectively, showing a depth of bend of a curved laminated glass.

The shapes of the outer glass sheet 11 and the inner glass sheet 12 according to this embodiment may be flat or curved. It is supposed that in the case of a glass sheet having a curved shape, the larger the depth of bend, the lower the sound insulation performance. "Depth of bend" is an amount indicating the bend of the glass sheet. For example, as shown in FIG. 4, when a straight line L connecting the center of an upper side and the center of a lower side of a glass sheet is set, the greatest distance of the distances between this straight line L and the glass sheet is defined as a "depth of bend D".

Figure 5:
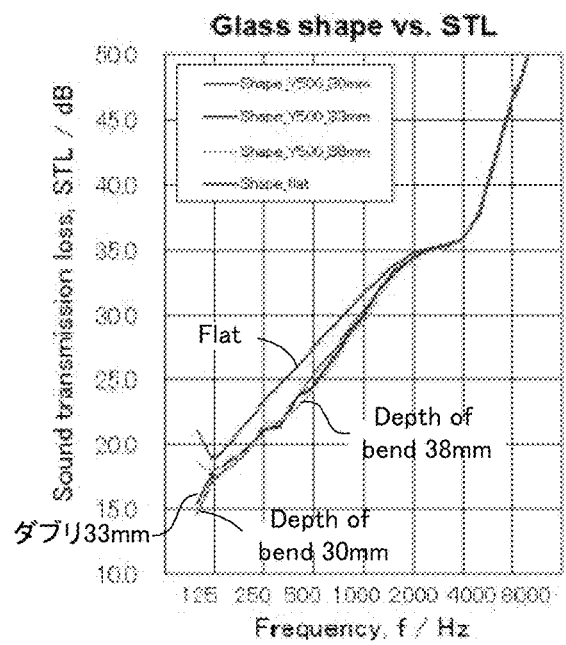
FIG. 5 is a graph showing a relationship between general frequency and sound transmission loss with respect to glass sheets having a curved shape and a glass sheet having a flat shape.

FIG. 5 is a graph showing a relationship between general frequency and sound transmission loss with respect to glass sheets having a curved shape and a glass sheet having a flat shape. It can be seen from FIG. 5 that there is not much difference in the sound transmission loss among the glass sheets having a curved shape whose depths of bend are within a range of 30 to 38 mm, but when compared with the glass sheet having a flat shape, those curved glass sheets have a low sound transmission loss in a frequency band of 4000 Hz or lower. Accordingly, in the case where a glass sheet having a curved shape is produced, smaller depth of bend is better, but if the depth of bend exceeds 30 mm, it is preferable to set the Young's modulus of the core layer of the interlayer to 18 MPa (frequency 100 Hz, temperature 20° C.) or less, as described later.

Figure 6:
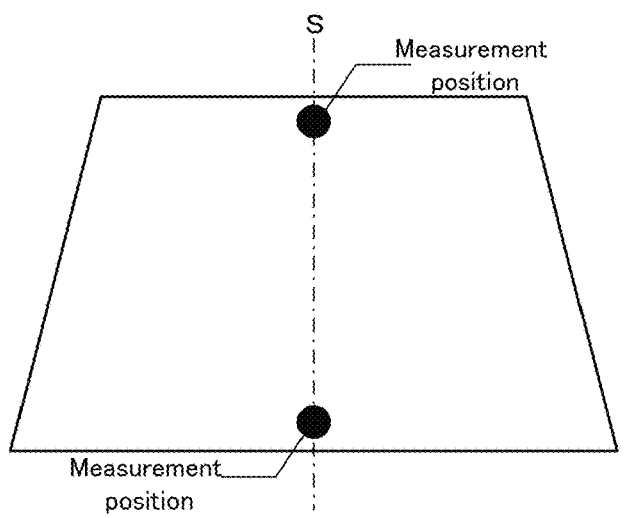
FIG. 6 is a schematic plan view showing thickness measurement positions on a laminated glass.

Here, an example of a method of measuring the thickness of a curved glass sheet will be described. First, with respect to the measurement position, as shown in FIG. 6, the measurement is performed at two positions: an upper position and a lower position on a center line S extending vertically in the center of a glass sheet in the horizontal direction. Although there is no particular limitation on the measuring apparatus, a thickness gauge such as SM-112 manufactured by TECLOCK Corporation can be used, for example. During measurement, the glass sheet is arranged such that the curved surface of the glass sheet is placed on a flat surface, and an end portion of the glass sheet is sandwiched and measured with the above-mentioned thickness gauge. It should be noted that a flat glass sheet can also be measured in the same manner as a curved glass sheet.

1-2. Interlayer

Next, the interlayer 13 will be described. The interlayer 13 includes at least one layer. For example, as shown in FIG. 3, the interlayer 13 can be configured by three layers, namely a soft core layer 131 and outer layers 132 that are harder than the core layer 131 and between which the core layer 131 is sandwiched. However, there is no limitation to this configuration, and it is sufficient if the interlayer 13 includes a plurality of layers including the core layer 131 and at least one outer layer 132 arranged on the outer glass sheet 11 side. For example, the interlayer 13 including two layers, namely the core layer 131 and one outer layer 132 arranged on the outer glass sheet 11 side, or the interlayer 13 in which an even number of two or more of the outer layers 132 are arranged on each side of the core layer 131 so that the core layer 131 is arranged at the center, or the interlayer 13 in which an odd number of outer layers 132 are arranged on one side of the core layer 131 and an even number of outer layers 132 are arranged on the other side so that the core layer 131 is sandwiched therebetween can also be formed. It should be noted that in the case where only one outer layer 132 is provided, the outer layer 132 is provided on the outer glass sheet 11 side as mentioned above, which is for the purpose of improving the breakage resistance performance with respect to an external force from the outside of a vehicle or a building. Moreover, when the number of outer layers 132 is increased, the sound insulation performance is improved.

Although there is no particular limitation on the hardness of the core layer 131 as long as the core layer 131 is softer than the outer layer 132, materials of the core layer 131 can be selected based on the Young's modulus, for example. Specifically, at a frequency of 100 Hz and a temperature of 20° C., the Young's modulus is preferably 1 to 20 MPa, more preferably 1 to 18 MPa, and particularly preferably 1 to 14 MPa. When the Young's modulus is set to be in such a range, it is possible to prevent a decrease in STL in a low frequency range of about 3500 Hz or lower.

In this regard, the inventors of the invention found that in general, when the Young's modulus of the core layer was reduced, the sound insulation performance was improved in a frequency range of 3000 to 5000 Hz. In this regard, Table 1 below shows the sound insulation performance of a laminated glass having an outer glass sheet and an inner glass sheet made of clear glass, and an interlayer including a core layer and outer layers located on both sides of this core layer. The outer glass sheet has a thickness of 2.0 mm, the inner glass sheet has a thickness of 1.3 mm, and the interlayer has a thickness of 0.76 mm, with the core layer having a thickness of 0.10 mm and each of the outer layers having a thickness of 0.33 mm. Table 1 below shows the sound transmission losses in a frequency range of 1250 to 10000 Hz. Specifically, the sound transmission losses are calculated in a case where the Young's modulus (measured at a frequency of 100 Hz and a temperature of 20° C.) of the interlayer is set to 25 MPa, 12.5 MPa, and 6.25 MPa (the calculation method is in accordance with a method in Examples, which will be described later), the sound transmission losses in the case where the Young's modulus is set to 25 MPa are used as references (the sound transmission losses in this case are shown as 0 in the table below because they are used as references), and differences in sound transmission loss (in dB) when the Young's modulus is set to 12.5 MPa and 6.25 MPa are shown. In this case, the outer layers have a Young's modulus of 560 MPa and a tan δ of 0.26 (temperature 20° C., frequency 100 Hz). It can be seen from Table 1 that in a frequency range of 3150 to 5000 Hz, the sound transmission loss is improved as the Young's modulus of the interlayer is reduced from 25 MPa to 12.5 MPa and 6.25 MPa.

With regard to the measurement method, it is possible to use a solid viscoelasticity measuring device DMA 50 manufactured by Metravib and perform frequency dispersion measurement with a strain amount of 0.05%, for example. In the following description, the Young's modulus as used herein refers to a measurement value obtained by using the above-described method, unless otherwise stated. However, although an actual measured value is used in measurement at a frequency equal to or lower than 200 Hz, a value that is calculated based on actual measured values is used at a frequency higher than 200 Hz. This calculated value is based on a master curve that is calculated from actual measured values using the WLF method.

On the other hand, as described later, it is preferable that the outer layers 132 have a large Young's modulus for the purpose of improving the sound insulation performance in a high frequency range, and the Young's modulus can be set to 560 MPa or more, 600 MPa or more, 650 MPa or more, 700 MPa or more, 750 MPa or more, 880 MPa or more, or 1300 MPa or more at a frequency of 100 Hz and a temperature of 20° C. Meanwhile, there is no particular limitation on the upper limit of the Young's modulus of each of the outer layers 132, but the Young's modulus can be set from the viewpoint of workability, for example. It is empirically known that when the Young's modulus is set to 1750 MPa or more, for example, the workability decreases, in particular, cutting is difficult. Moreover, it is preferable to set the Young's modulus of the outer layer on the outer glass sheet 1 side to be greater than the Young's modulus of the outer layer on the inner glass sheet 2 side. Accordingly, the breakage resistance performance with respect to an external force from the outside of a vehicle or a building can be improved.

At a frequency of 100 Hz and a temperature of 20° C., tan δ of the core layer 131 can be set to 0.1 to 0.9. When tan δ is within the above-mentioned range, the sound insulation performance is improved.

In this regard, the inventors of the invention found that in general, when tan δ of the core layer was increased, the sound insulation performance was improved in a frequency range of 5000 to 10000 Hz. In this regard, Table 2 below shows the sound insulation performance of a laminated glass having an outer glass sheet and an inner glass sheet made of clear glass, and an interlayer including a core layer and outer layers located on both sides of this core layer. The outer glass sheet has a thickness of 2.0 mm, the inner glass sheet has a thickness of 1.3 mm, and the interlayer has a thickness of 0.76 mm, with the core layer having a thickness of 0.10 mm and each of the outer layers having a thickness of 0.33 mm. It should be noted that in this case, the Young's moduli of the core layer and the outer layers are 12.5 MPa and 560 MPa (measured at a frequency of 100 Hz and a temperature of 20° C.), respectively. Table 2 below shows the sound transmission losses in a frequency range of 1250 to 10000 Hz. Specifically, the sound transmission losses are calculated in a case where tan δ (measured at a frequency of 100 Hz and a temperature of 20° C.) of the interlayer is set to 0.8, 1.2, and 1.6 (the calculation method is in accordance with a method in Examples, which will be described later), the sound transmission losses in the case where tan δ is set to 0.8 are used as references (the sound transmission losses in this case are shown as 0 in the table below because they are used as references), and differences in sound transmission loss (in dB) when tan δ is set to 1.2 and 1.6 are shown. It should be noted that the outer layers have a tan δ of 0.26. It can be seen

TABLE 1

|  | 1250 | 1600 | 2000 | 2500 | 3150 | 4000 | 5000 | 6300 | 8000 | 10000 |
| --- | --- | --- | --- | --- | --- | --- | --- | --- | --- | --- |
| 6.25 MPa | 0.3 | 0.6 | 1.1 | 1.7 | 2.2 | 2.3 | 0.3 | −2.4 | −1.7 | −1.2 |
| 12.5 MPa | 0.1 | 0.3 | 0.6 | 0.9 | 1.3 | 1.3 | 0 | −1.1 | −0.8 | −0.5 |
| 25 MPa | 0.0 | 0.0 | 0.0 | 0.0 | 0.0 | 0.0 | 0.0 | 0.0 | 0.0 | 0.0 | from Table 2 that in a frequency range of 5000 to 10000 Hz, the sound transmission loss is improved as tan δ of the interlayer is increased from 0.8 to 1.2 and 1.6.

TABLE 2

|     | 1250 | 1600 | 2000 | 2500 | 3150 | 4000 | 5000 | 6300 | 8000 | 10000 |
|-----|------|------|------|------|------|------|------|------|------|-------|
| 1.6 | −0.1 | −0.2 | −0.3 | −0.4 | −0.4 | 0.2  | 1.4  | 2.0  | 1.5  | 1.2   |
| 1.2 | 0.0  | −0.1 | −0.2 | −0.2 | −0.2 | 0.2  | 0.9  | 1.2  | 0.9  | 0.7   |
| 0.8 | 0.0  | 0.0  | 0.0  | 0.0  | 0.0  | 0.0  | 0.0  | 0.0  | 0.0  | 0.0   |

Although there is no particular limitation on the materials constituting the layers 131 and 132, the materials are required to be such that at least the Young's moduli of the layers can be set within respective ranges as described above. The outer layers 132 can be made of a polyvinyl butyral resin (PVB), for example. A polyvinyl butyral resin has excellent adhesiveness to the glass sheets and penetration resistance and is thus preferable. On the other hand, the core layer 131 can be made of an ethylene vinyl acetate resin (EVA) or a polyvinyl acetal resin, which is softer than the polyvinyl butyral resin included in the outer layers. When the soft core layer is sandwiched between the outer layers, it is possible to significantly improve the sound insulation performance while keeping the adhesiveness and the penetration resistance that are equivalent to those of a single-layered resin interlayer.

Generally, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer to be added, and the like. Accordingly, a hard polyvinyl butyral resin that is used for the outer layers 132 and a soft polyvinyl butyral resin that is used for the core layer 131 can be produced with the same polyvinyl butyral resin by appropriately adjusting at least one condition selected from the aforementioned conditions. Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin, the softer the resulting polyvinyl acetal resin tends to be. Accordingly, for example, if the outer layers 132 are made of a polyvinyl butyral resin, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer 131. It should be noted that there is no limitation to the above-mentioned resins and the like as long as predetermined Young's moduli can be obtained.

The total thickness of the interlayer 13 is not particularly specified, but is preferably 0.3 to 6.0 mm, more preferably 0.5 to 4.0 mm, and particularly preferably 0.6 to 2.0 mm. Meanwhile, the thickness of the core layer 131 is preferably 0.1 to 2.0 mm and more preferably 0.1 to 0.6 mm. On the other hand, the thickness of each of the outer layers 132 is preferably 0.1 to 2.0 mm and more preferably 0.1 to 1.0 mm. Alternatively, it is also possible to fix the total thickness of the interlayer 13 and adjust the thickness of the core layer 131 without exceeding the fixed total thickness.

Figure 7:
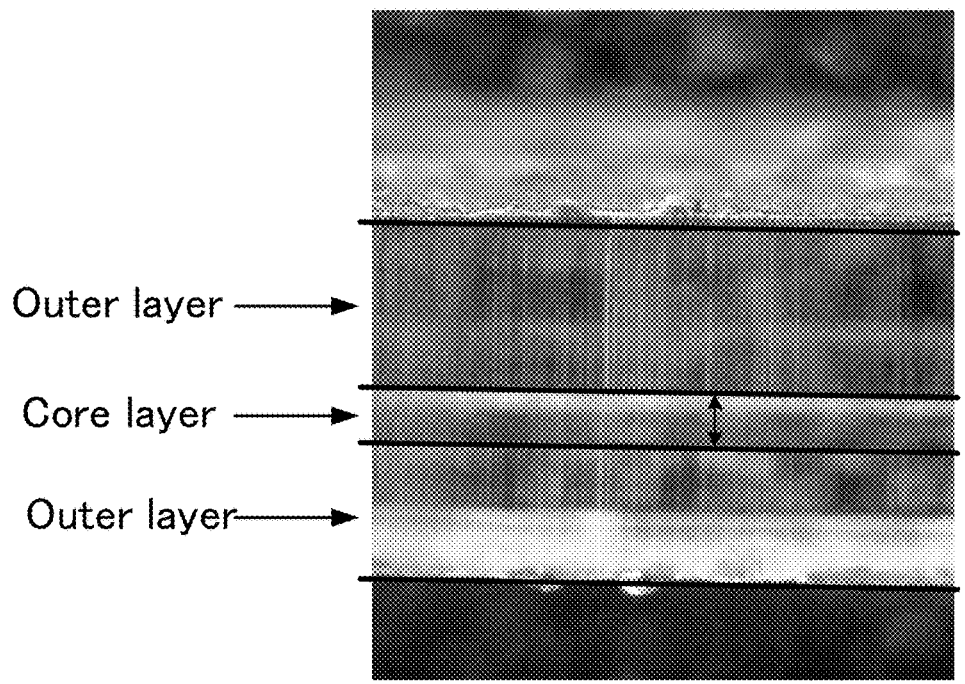
FIG. 7 is an example of an image that is used for measurement of an interlayer.

The thicknesses of the core layer 131 and the outer layers 132 can be measured as described below, for example. First, the cross section of a laminated glass is enlarged by a factor of 175 and displayed using a microscope (e.g., VH-5500 manufactured by Keyence Corporation). Then, the thicknesses of the core layer 131 and the outer layers 132 are visually identified and measured. At this time, in order to eliminate variations seen in visual identification, the measurement is performed five times, and an average values are taken as the thicknesses of the core layer 131 and the outer layers 132. For example, an enlarged photograph of a laminated glass as shown in FIG. 7 is taken, in which the core layer 131 and the outer layers 132 have been identified, and the thicknesses of the identified core layer 131 and outer layers 132 are measured.

It should be noted that the core layer 131 and the outer layers 132 of the interlayer 13 are not required to have a constant thickness over the entire surface. For example, the core layer 131 and the outer layers 132 can also have a wedge shape so as to be suited to a laminated glass that is used for a head-up display. In this case, the thicknesses of the core layer 131 and the outer layers 132 of the interlayer 13 are measured at positions having the smallest thickness, that is, in the lowest side portion of the laminated glass. If the interlayer 13 has a wedge shape, the outer glass sheet and the inner glass sheet are not arranged in parallel, but it should be construed that such an arrangement is also included in the arrangement of the glass sheets of the present invention. That is, the arrangement according to the present invention includes the arrangement of the outer glass sheet 11 and the inner glass sheet 12 when the interlayer 13 including the core layer 131 and the outer layers 132 whose thicknesses increase at a rate of change of 3 mm or less per meter is used, for example.

Although there is no particular limitation on the method of manufacturing the interlayer 13, examples thereof include a method in which a resin component, such as the above-described polyvinyl acetal resin, a plasticizer, and other additives, if necessary, are mixed and uniformly kneaded, and then the layers are collectively extruded, and a method in which two or more resin films that are produced using this method are laminated with a pressing process, a lamination process, or the like. In the method of laminating with the pressing process, the lamination process, or the like, each of the resin films before laminating may have a single-layer structure or may have a multilayer structure. Moreover, the interlayer 13 may include a single layer instead of the plurality of layers as mentioned above.

1-3. Light Transmittance of Laminated Glass

As mentioned above, the laminated glass according to this embodiment is used in a windshield of an automobile for a front safety system using a camera. Such a safety system receives visible light or infrared rays from a preceding vehicle to take images, and measures the speed of a preceding automobile and the distance to the preceding automobile. Therefore, the laminated glass is required to achieve transmittance with respect to light having a wavelength in a predetermined range.

Some of the safety systems as mentioned above use an infrared camera to measure the speed of a preceding vehicle and the distance to the preceding vehicle, for example. In such a case, a useful transmittance with respect to light (infrared rays) having a wavelength of 700 to 800 nm is 30% or more and 80% or less, and preferably 40% or more and 60% or less. A method of measuring transmittance is performed in accordance with ISO9050.

1-4. Method of Manufacturing Laminated Glass

There is no particular limitation on the method of manufacturing the above-mentioned laminated glass, and a conventionally known method of manufacturing a laminated glass can be adopted. For example, first, the mask layer 2 is formed on the inner glass sheet 12 as described below. Next, after the inner glass sheet 12 passes through a heating furnace and thus is heated to about 650° C., the inner glass sheet 12 is molded into a curved shape using a mold. In this case, the curved shape may have a curvature only in a single direction or curvatures in a plurality of directions. Then, a windshield is obtained by performing annealing outside the heating furnace. The outer glass sheet 1 is molded in the same manner.

Figure 8:
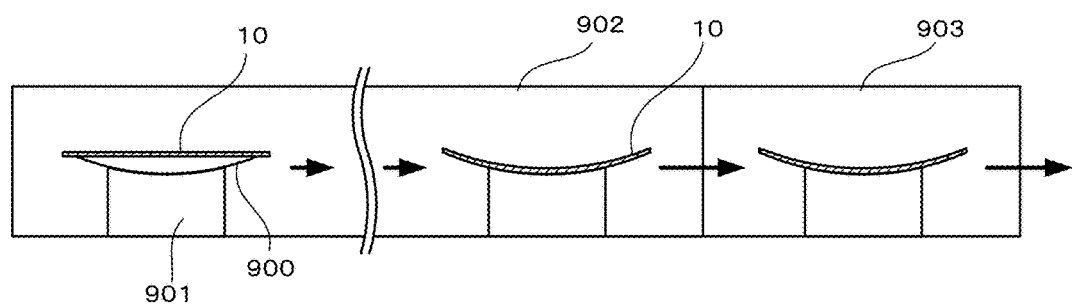
FIG. 8 is a side view showing an example of a method of manufacturing a glass sheet.

Here, a specific example of molding of a glass sheet 10 (outer glass sheet 11 or inner glass sheet 12) will be described with reference to FIG. 8. First, the glass sheet 10 having a flat shape on which a mask layer has been formed is placed on a ring-shaped (frame-shaped) mold 900. This mold 900 is arranged on a conveyance base 901, and the conveyance base 901 passes through the inside of the heating furnace 902 and the inside of an annealing furnace 903 in the state in which the glass sheet 10 is placed on the mold 900. Since the mold 900 has a ring shape, the glass sheet 10 passes through the heating furnace 902 in the state in which only the peripheral edge portion is supported. Then, when the glass sheet 10 is heated to a temperature near the softening point in the heating furnace 902, the inner portion with respect to the peripheral edge portion of the glass sheet 10 is curved downward under its own weight, and thus the glass sheet 10 is molded into a curved shape. Subsequently, the glass sheet 10 is carried into an annealing furnace 503 from the heating furnace 902, and annealing processing is performed. Thereafter, the glass sheet 10 is carried out of the annealing furnace 903 and allowed to cool. It should be noted that a molding method other than this can be performed, and the glass sheet 10 can be molded into a curved shape by press molding after being carried out of the heating furnace 902, for example.

After the outer glass sheet 11 and the inner glass sheet 12 are molded in this manner, the interlayer 13 is sandwiched between the outer glass sheet 1 and the inner glass sheet 12, and these are placed into a rubber bag and preliminarily bonded together at about 70 to 110° C. under vacuum suction. Preliminary bonding can be performed using a method other than this method. For example, the interlayer 13 is sandwiched between the outer glass sheet 11 and the inner glass sheet 12, and these are heated at 45 to 65° C. in an oven. Subsequently, this laminated glass is pressed by a roller at 0.45 to 0.55 MPa. Then, this laminated glass is again heated at 80 to 105° C. in an oven and thereafter again pressed by a roller at 0.45 to 0.55 MPa. Thus, preliminary bonding is finished.

Next, permanent bonding is performed. The preliminarily bonded laminated glass is permanently bonded using an autoclave at a pressure of 8 to 15 atmospheres and at 100 to 150° C., for example. Specifically, permanent bonding can be performed under the conditions of a pressure of 14 atmospheres and 145° C., for example. Thus, the laminated glass according to this embodiment is manufactured.

It should be noted that when a single glass sheet is used as the glass sheet, it is sufficient if one of the above-described glass sheets is used. The method of manufacturing the glass sheet is performed in the same manner: specifically, a mask layer is formed on the inner surface of the glass sheet, and then the glass sheet is molded into a curved shape.

Moreover, in attaching the laminated glass to an automobile, the attachment angle of the laminated glass is preferably set to an angle of 45 degrees or less to the vertical.

2. Mask Layer

Figure 9:
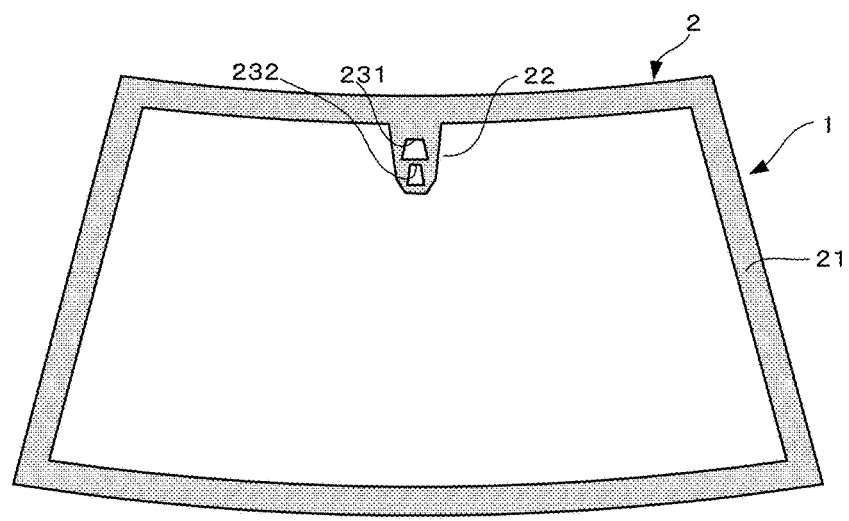
FIG. 9 is a plan view of a glass sheet.

The mask layer 2 as shown in FIG. 9 is formed adjacent to the glass sheet 1. The mask layer 2 serves as a region for concealing, from the outside, an adhesive that is applied to attach the glass sheet 1 to a vehicle body, and the like, and includes a peripheral edge mask layer 21 that is formed at the outer peripheral edge of the glass sheet 1 and a center mask layer 22 that extends downward from the peripheral edge mask layer 21 at the center of the upper edge of the glass sheet 1. The above-described measurement unit 4 is attached to the center mask layer 22. It is sufficient if the measurement unit 4 is arranged such that light emitted by a sensor 5 passes through the center of an opening and light reflected by a preceding vehicle and an obstacle can be received. Although the mask layer 2 can be made of various materials, there is no limitation on the materials as long as the mask layer 2 can block a visual field from the outside of the vehicle, and the mask layer 2 can be formed by applying ceramic of a dark color such as black to the glass sheet 1, for example.

Figure 10:
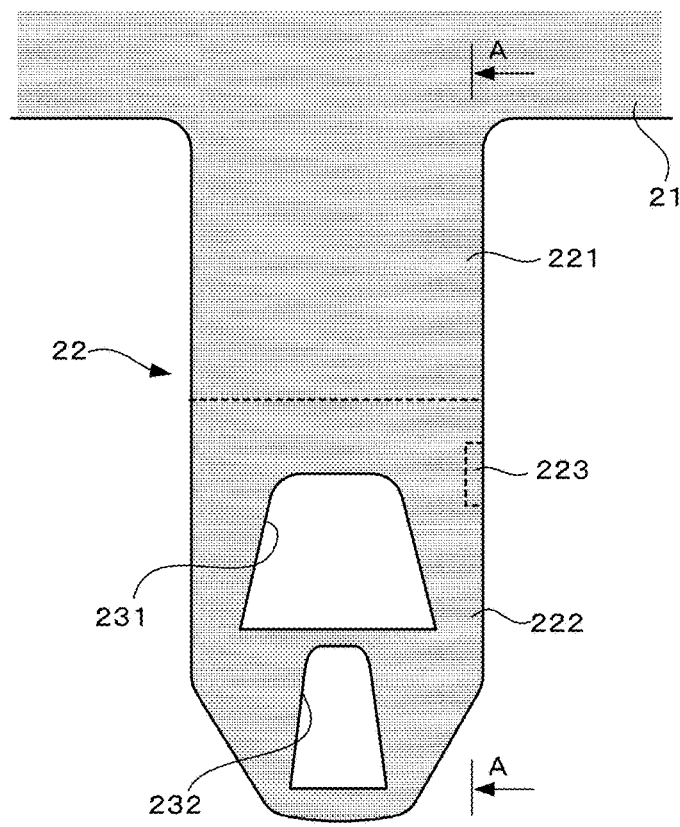
FIG. 10 is an enlarged plan view of a center mask layer.

Next, the center mask layer 22 will be described. As shown in FIG. 10, the center mask layer 22 is formed in a rectangular shape that extends vertically, and two openings that are lined up in the vertical direction, namely an upper opening 231 and a lower opening 232, are formed in the center mask layer 22. Both the upper opening 231 and the lower opening 232 are formed in a trapezoidal shape, and the width of the lower opening 232 in the left-right direction is approximately half of that of the upper opening 231. However, the lengths in the vertical direction are substantially the same. Although there is no particular limitation on the sizes of the openings, the upper opening 231 can be formed so as to have a longitudinal length of about 58 mm and a lateral length of about 58 mm, and the lower opening 232 can be formed so as to have a longitudinal length of about 52 mm and a lateral length of about 27 mm.

The center mask layer 22 has three regions, and is constituted by an upper region 221 that is located on the upper side with respect to the upper opening 231, a lower region 222 that is located on the lower side with respect to this upper region 221 and in which both the openings 231 and 232 are formed, and a small rectangular lateral region 223 that is formed in the lateral portion of this lower region 222.

Figure 11:
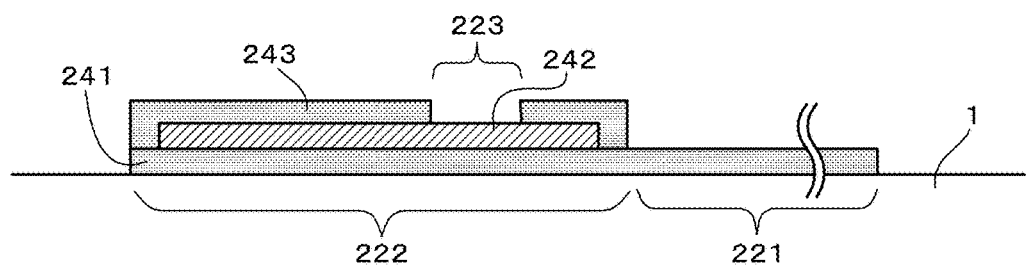
FIG. 11 is a cross-sectional view taken along line A-A in FIG. 9.

Next, the layer configuration of each of the regions will be described. As shown in FIG. 11, the upper region 221 includes a single layer of a first ceramic layer 241 made of black ceramic. The lower region 222 includes three layers that are laminated on the inner surface of the glass sheet 1, namely the above-mentioned first ceramic layer 241, a silver layer 242, and a second ceramic layer 243. The silver layer 242 is made of silver, and the second ceramic layer 243 is made of the same material as the material of the first ceramic layer 241. The lateral region 223 includes two layers that are laminated on the inner surface of the glass sheet 1, namely the first ceramic layer 241 and the silver layer 242, and the silver layer 242 is exposed to the vehicle interior side. The first ceramic layer 241, which is the undermost layer, is shared by all the regions, and the silver layer 242, which is the second layer, is shared by the lower region 222 and the lateral region 223.

The center mask layer 22 can be formed as described below, for example. First, the first ceramic layer 241 is applied to the entire surface with a screen printing process, and the silver layer 242 is applied to the first ceramic layer 241 in the regions corresponding to the lower region 222 and the lateral region 223. Lastly, the second ceramic layer 243 is applied to the region corresponding to the lower region 222. It should be noted that in the lower region 222, the region in which the silver layer 242 is formed corresponds to the position at which the sensor of the measurement unit 4, which will be described later, is arranged. Moreover, the silver layer 242, which is exposed in the lateral region 223, is provided with wiring for grounding. It should be noted that the ceramic layers and the silver layer can also be produced by transferring a transfer film for firing to the glass sheet and firing it.

Although the ceramic layers 241 and 243 can be made of various materials, the composition listed below can be used, for example.

TABLE 3

| First table | | |
|---|---|---|
| | | First and second colored ceramics pastes |
| Pigment *1 | mass % | 20 |
| Resin (cellulose resin) | mass % | 10 |
| Organic solvent (pine oil) | mass % | 10 |
| Glass binder *2 | mass % | 65 |
| Viscosity | dPs | 150 |

*1, Main components: copper oxide, chromium oxide, iron oxide, and manganese oxide
*2, Main components: bismuth borosilicate, zinc borosilicate Although there is no particular limitation on the composition of the silver layer 242, the composition listed below can be used, for example.

TABLE 4

| Second table | | |
|---|---|---|
| | | Conductive ceramics pastes |
| Silver particles (average particle diameter: 10 μm) | mass % | 70 |
| Glass binder *1 | mass % | 10 |
| Resin (cellulose resin) | mass % | 5 |
| Organic medium (terpineol) | mass % | 15 |
| Viscosity | dPs | 180 |

*1, Main components: bismuth borosilicate, zinc borosilicate

The screen printing can be performed under the conditions that a polyester screen of 355 mesh is used, the coating thickness is 20 μm, the tension is 20 Nm, the squeegee hardness is 80 degrees, the attachment angle is 75°, and the printing speed is 300 mm/s, and the ceramic layers and the silver layer can be formed by performing drying in a drying furnace at 150° C. for 10 minutes. It should be noted that when the first ceramic layer, the silver layer, and the second ceramic layer are laminated in this order, it is sufficient if the above-described screen printing and drying are repeated.

3. Measurement Unit

Figure 12:
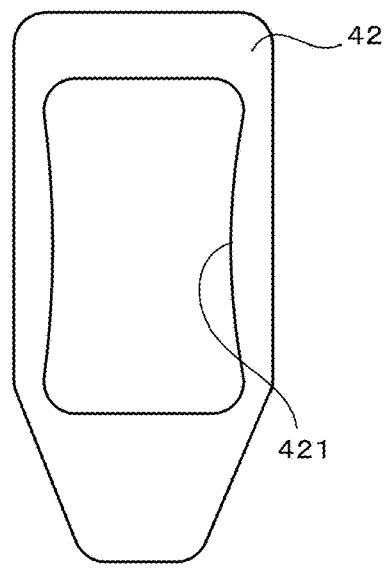
FIG. 12 are plan views of parts included in a measurement unit.
Figure 12:
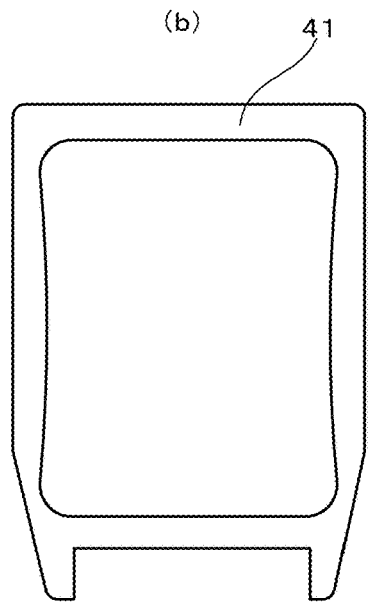
Figure 12:
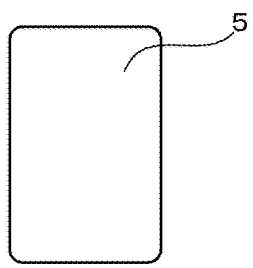
Figure 12:
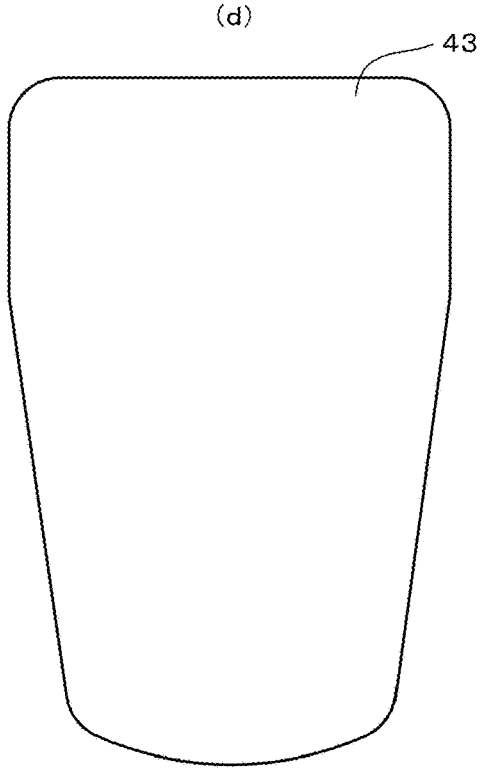

As shown in FIG. 12, the measurement unit 4 is configured as described below. FIG. 12 are plan views of parts included in the measurement unit. This measurement unit 4 includes a bracket 42 that is fixed to the inner surface of the glass sheet 1, a frame-shaped cover base 41 that is fixed to the periphery of the bracket 42, the sensor 5 (information acquisition device) that is supported by the bracket, a harness (not shown) that is connected to the sensor, and a cover 43 that is fixed to the cover base 41 and covers the bracket 42, the sensor 5, and the harness from the vehicle interior side.

The bracket 42 is formed in a rectangular shape, and is fixed to the above-described center mask layer 22 using an adhesive. An opening 421 is formed at the center of this bracket 42, and has a size inside which the two openings 231 and 232 of the center mask layer 22 are included. The cover base for fixing the cover 43 is fixed to the periphery of this bracket 42 using a double-sided tape. At this time, the cover base 41 is formed to have such a size that the outer edge of the cover base 41 is aligned with the outer edge of the center mask layer 22 or is located inside the outer edge of the center mask layer 22.

The sensor 5 having a rectangular shape is fixed to the bracket 42 so as to cover the opening 421 of the bracket 42. The sensor 5 will be described in detail later. After the cover base 41, the sensor 5, and the harness are attached to the bracket 42 in this manner, the cover 43 is attached to the cover base 41. Specifically, the outer edge of the cover 43 is fixed to the outer edge of the cover base 41 by insertion or the like.

The cover 43 is attached so as to cover the bracket 42 and the sensor 5, so that the bracket 42 and the sensor 5 cannot be seen from the vehicle interior side. It should be noted that since the center mask layer 22 has been formed, the measurement unit 4 also cannot be seen from the vehicle exterior side with the exception of the upper opening 231 and the lower opening 232.

Figure 13:
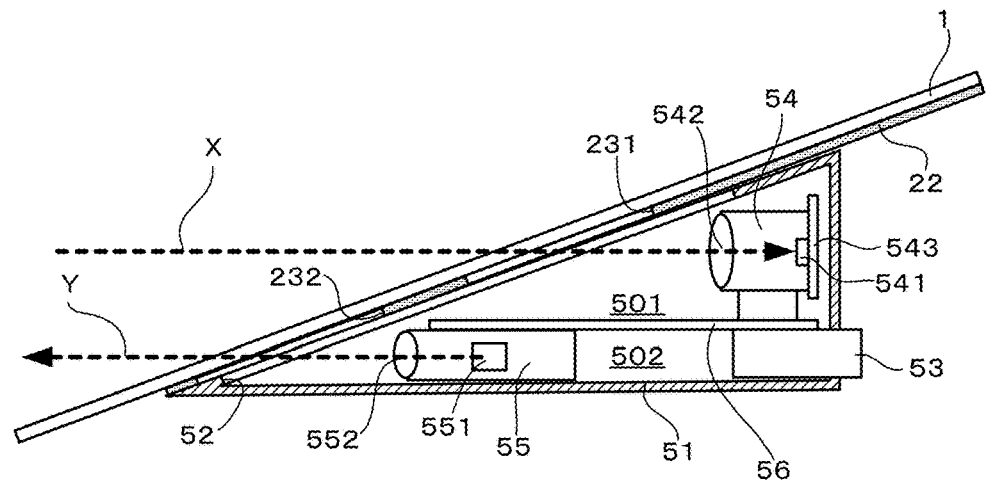
FIG. 13 is a cross-sectional view of a sensor.

Next, the outline of the sensor 5 will be described with reference to FIG. 13. FIG. 13 is a cross-sectional view of the sensor. As shown in this diagram, the sensor 5 includes a housing 51 having a triangular shape in a side view, and the front surface of this housing 51 is arranged so as to be coincident with the opening 421 of the bracket 42 and comes into contact with the inner surface of the glass sheet 1. The inside of the housing 51 is partitioned into an upper space 501 having a triangular shape in a side view and a lower space 502 having a trapezoidal shape in a side view, and a front opening 52 that is in communication with the upper space and the lower space is formed in the front surface of the housing 51. On the other hand, a connector 53 is attached to the back surface of the housing 51 and is used for the connection to an external device.

Figure 14:
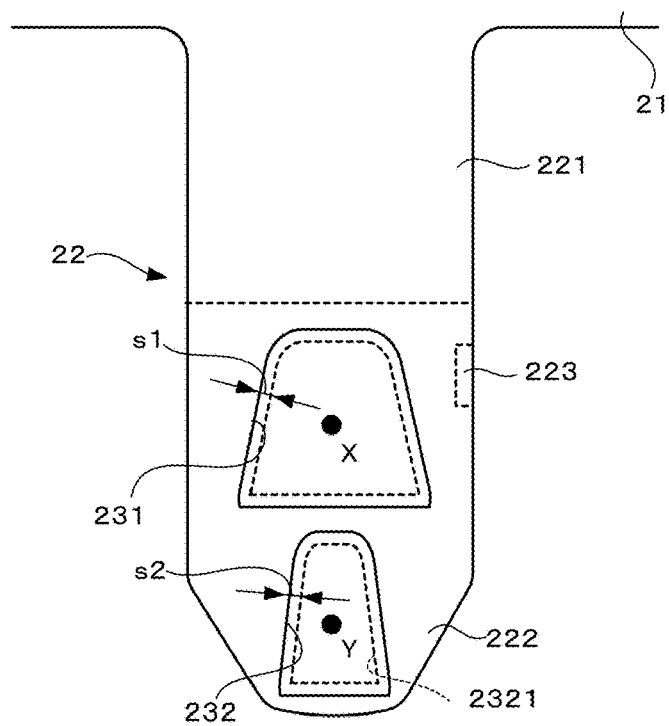
FIG. 14 is an enlarged plan view of a center mask layer.

A first supporting portion 54 is arranged in the upper space 501, and a first control substrate 541 and a light receiving lens 542 are arranged in a direction toward the front side from the rear side in this first supporting portion 54. A light receiving element 543 is installed on the first control substrate 541 to receive a laser beam that passes through the light receiving lens 542 and convert the laser beam into electric signals. The electric signals are amplified in the first control substrate 541 and transmitted to a second control substrate 56, which will be described later. The light receiving lens 542 is arranged so as to face the outside through the above-described front opening 52 via the upper opening 231 of the center mask layer 22. In particular, the position and the size of the upper opening 231, the position of the sensor 5, and the like are adjusted such that a path of light to be received by the light receiving element 543 passes through the center of the upper opening 231. Specifically, as shown in FIG. 13 and FIG. 14, a distance s1 between a passage range X of a laser (light) and the peripheral edge of the upper opening 231 is preferably 4 mm or more, and more preferably 6 mm or more. Moreover, reflected light in multiple directions that has been reflected by a preceding vehicle and an obstacle passes through the center of the upper opening 231 and received by the light receiving element 543.

On the other hand, a second supporting portion 55 is arranged in the lower space 502, and a laser emitting element 551 and an irradiation lens 552 are supported in this order in a direction toward the front side from the rear side in this second supporting portion 55. The laser emitting element 551 is a laser diode or the like for emitting a laser beam in a near infrared wavelength range of 850 nm to 980 nm, and the irradiation lens 552 is a lens for shaping the laser beam emitted by the laser emitting element 551 into a predetermined beam shape. The irradiation lens 552 is arranged so as to face the outside through the front opening 52 of the housing 51 via the lower opening 232 of the center mask layer 22. In particular, the position and the size of the lower opening 232 and the position of the sensor 5 are adjusted such that a path of a laser beam emitted by the laser emitting element 551 passes through the center of the lower opening 232. Specifically, as shown in FIG. 13 and FIG. 14, a distance s2 between a passage range Y of a laser (light) and the peripheral edge of the lower opening 232 is preferably 4 mm or more, and more preferably 6 mm or more.

The second control substrate 56 is arranged on the upper surface of the second supporting portion 55 and performs driving of the laser emitting element 551, processing of electric signals transmitted from the first control substrate 541, and the like.

The operation of the measurement unit will be described below. First, the first control substrate 541 transmits a laser beam pulse from the laser emitting element 551. The distance from a preceding vehicle or an obstacle to the subject vehicle is calculated based on the time until reflected light, which is the laser beam reflected by the preceding vehicle or the obstacle, is received by the light receiving element 543. The calculated distance is transmitted to an external device via the connector 53 and used for control of a brake and the like.

Antenna

Figure 15:
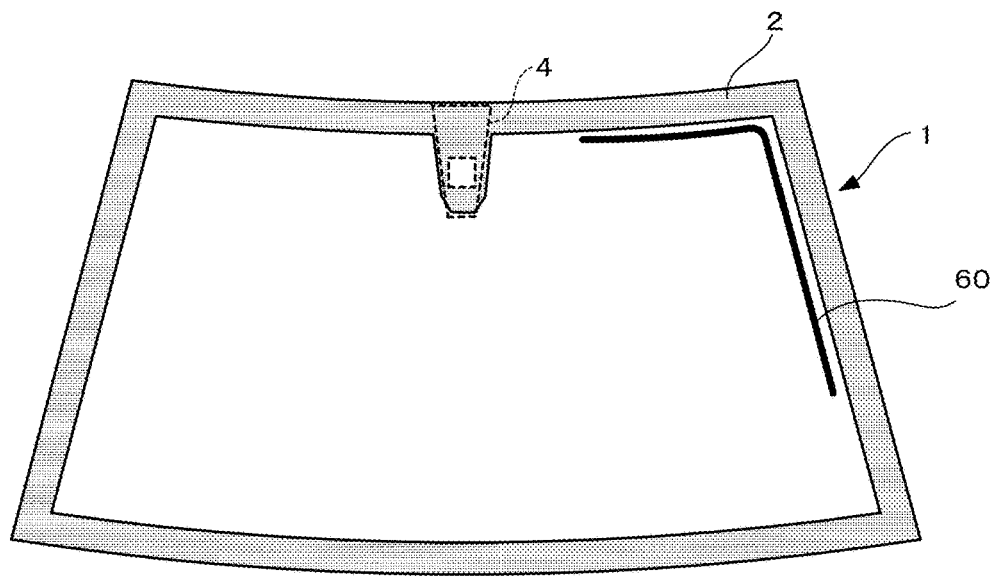
FIG. 15 is a plan view of a glass sheet to which an antenna is attached.

An antenna is provided on the glass sheet for a radio and a digital television. Although there are various aspects, an antenna 60 can be formed in an L shape extending from a portion of the upper side of the surface of the glass sheet 1 on the vehicle interior side to a portion of the right side thereof as shown in FIG. 15, for example. As a method of producing the antenna, the antenna can be formed by printing the same material as that of the silver layer of the mask layer on the glass sheet by screen printing, for example. Moreover, in the same manner as the mask layer, the antenna is printed on the glass sheet before the glass sheet is conveyed to the heating furnace.

4. Features

As described above, with this embodiment, the following effects can be obtained. The mask layer 2 is formed adjacent to the glass sheet 1 as mentioned above. Thereafter, the glass sheet 1 is heated and molded. At this time, the mask layer 2 has a dark color such as black and thus absorbs a larger amount of heat in the glass sheet 1 compared with the regions in which the mask layer 2 is not formed, such as the upper opening 231 and the lower opening 232. In addition, the thermal expansion coefficient of the mask layer 2 is different from that of the glass sheet 1. For example, the above-described mask layer 2 (ceramic) has a linear expansion coefficient of $70 \times 10^{-7}$ to $100 \times 10^{-7}/°$ C., and glass has a linear expansion coefficient of $1 \times 10^{-6}$ to $10 \times 10^{-6}/°$ C. Therefore, compressive stress and tensile stress occur during molding in the region in which the mask layer 2 has been formed. Moreover, distortion occurs near the boundary between the glass sheet 1 and the upper opening 231 and the boundary between the glass sheet 1 and the lower opening 232 due to the difference in the curvature of the glass surface between the outer glass sheet and the inner glass sheet. If the windshield is made of a laminated glass, and the thickness of the outer glass sheet 11 is larger than that of the inner glass sheet, the inner glass sheet 12 is more largely curved than the outer glass sheet 11 near the boundaries, and therefore, distortion is more prominent in a laminated glass constituted by glass sheets having different thicknesses. As a result, when a laser beam is emitted and received, there is a risk that light cannot be accurately emitted or received due to light being refracted due to the distortion.

Therefore, in this embodiment, as shown in FIG. 13, the path X of a laser beam to be emitted and received is configured to pass through near the centers of the upper opening 231 and the lower opening 232 so as to avoid the region in which distortion occurs, thus making it possible to prevent the influence of distortion, such as refraction, on the laser beam. As a result, the laser beam can be accurately emitted and received, thus making it possible to accurately calculate the distance between vehicles.

Since the silver layer 242 is formed in the mask layer 2, it is possible to block the emission of electromagnetic waves emitted by the sensor 5 to the outside. Accordingly, it is possible to prevent noise caused by the electromagnetic waves emitted by the sensor 5 from entering in the voice and the image of an AM (long wave, medium wave, short wave) radio, an FM (frequency higher than that of an ultrashort wave) radio, and a digital television (frequency of 470 to 720 MHz). In a vehicle in which the antenna is mounted on the glass sheet, the silver layer 242 is effective as an electromagnetic wave blocking function. Since the radio/digital television antenna mounted on the windshield is close to the sensor 5 and is more easily affected by the electromagnetic waves, the formation of the silver layer 242 is effective. The silver layer 242 is sandwiched by the black ceramic layers 241 and 243, and thus is prevented from being seen from the outside of the vehicle and the inside of the vehicle. Accordingly, the formation of the silver layer 242 has no influence on the external appearance. Furthermore, since the center mask layer 22 is covered with the bracket, the cover, and the like, it is possible to prevent an electric influence on the outside.

It should be noted that the first embodiment can be modified as described below. For example, although an example of the sensor 5 for measuring the distance between vehicles is shown in the above embodiment, there is no limitation to this. There is no particular limitation on the sensor as long as the sensor can be used to measure the distance between vehicles by emitting light and receiving the reflected light.

In the above embodiment, the sensor 5 for measuring the distance between vehicles is used as the information acquisition device according to the present invention, but there is no limitation to this, and various information acquisition devices can be used. That is, there is no limitation as long as the information acquisition device emits and/or receives light in order to acquire information from the outside of the vehicle. Various devices can be used such as a visible light/infrared camera for measuring the distance between vehicles, a light receiving device for receiving signals from the outside of the vehicle that are emitted by an optical beacon or the like, and a camera using visible light and/or infrared rays that reads white lines on the road or the like as images. Here, when only one of emitting light and receiving light is performed, one opening is formed in the center mask layer. It is also possible to provide a plurality of openings depending on the type of light. It should be noted that the information acquisition device is in contact with or is not in contact with the glass sheet.

Figure 16:
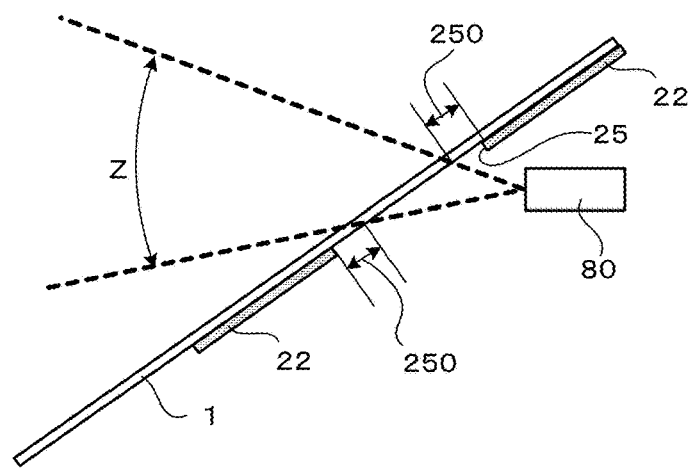
FIG. 16 is a cross-sectional view of a glass sheet showing an imaging range of a camera.

When a camera is used as the information acquisition device as described above, the imaging range (passage range Z of visible light or infrared rays) of the camera is adjusted as described below in an opening 25 of the center mask layer 22. That is, as shown in FIG. 16, a distance s3 between the peripheral edge of the imaging range of a camera 80 and the peripheral edge of the opening is preferably 4 mm or more, and more preferably 6 mm or more.

B. Second Embodiment

Next, a windshield according to a second embodiment of the present invention will be described. This embodiment differs from the first embodiment in the configuration of the information acquisition device. Specifically, in this embodiment, a camera unit 4 incorporated with a camera is attached to the mask layer 2 on the windshield shown in FIG. 1. Images taken by the camera unit 4 are processed by an image processing device (see FIG. 19) to calculate the distance between vehicles and the like. The description of the same configurations as those of the first embodiment will be omitted, and the configurations of the camera unit and the mask layer, which are different portions, will be mainly described below.

1. Mask Layer

Since the camera unit is used in this embodiment, the configuration of the center mask layer of the mask layer is different from that of the first embodiment. It is sufficient if the camera unit 4 is arranged such that images forward of the vehicle through an opening, which will be described later, can be taken, and specifically, the camera unit 4 is configured as described below.

Figure 17:
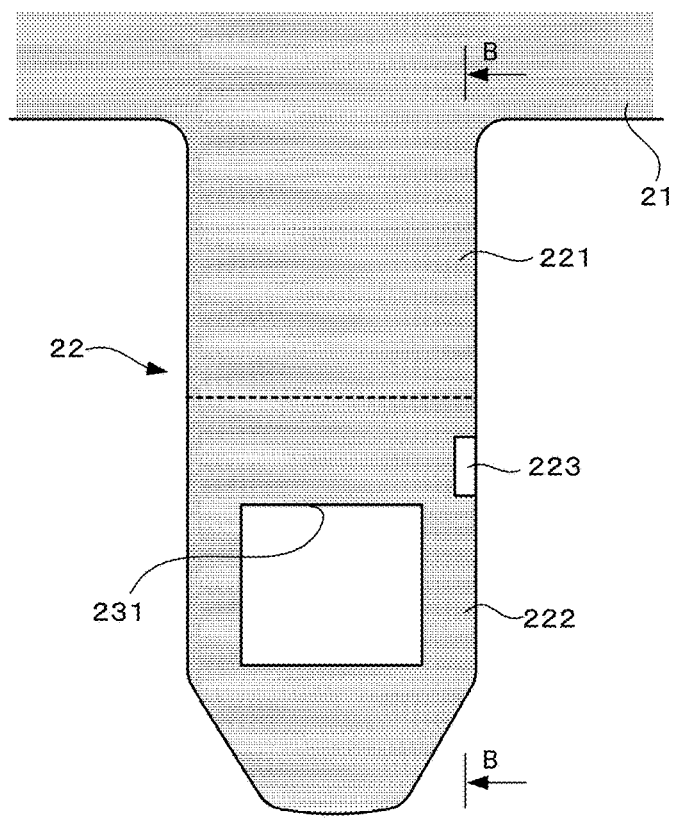
FIG. 17 is an enlarged plan view of a center mask layer.
Figure 18:
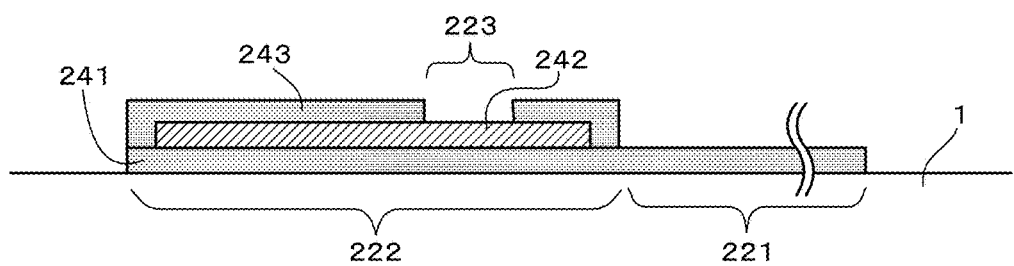
FIG. 18 is a cross-sectional view taken along line B-B in FIG. 17.

FIG. 17 is an enlarged plan view of the center mask layer, and FIG. 18 is a cross-sectional view taken along line B-B in FIG. 17. As shown in FIG. 17, the center mask layer 22 is formed in a rectangular shape that extends vertically, and a rectangular opening 231 is formed in the lower portion of the center mask layer 22. Although there is no particular limitation on the size of the opening 231, the opening 231 can be formed so as to have a longitudinal length of about 58 mm and a lateral length of about 58 mm, for example.

The center mask layer 22 has three regions in the same manner as in the first embodiment, and is constituted by an upper region 221 that is located on the upper side with respect to the opening 231, a lower region 222 located on the lower side with respect to this upper region 221 and in which the opening 231 is formed, and a small rectangular lateral region 223 that is formed in the lateral portion of this lower region 222. These points are the same as those of the first embodiment.

2. Camera Unit

Figure 19:
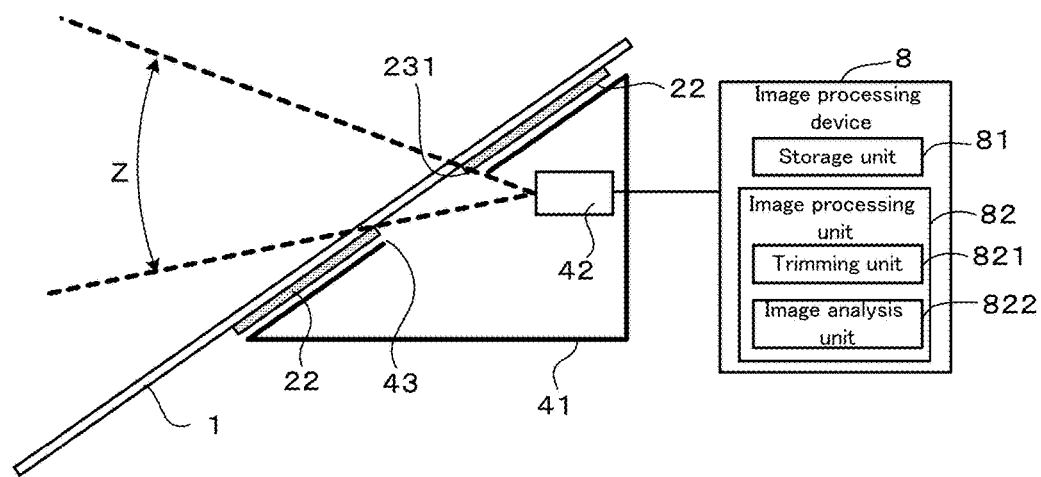
FIG. 19 is a cross-sectional view of a glass sheet including a camera unit.

As shown in FIG. 19, the camera unit 4 is configured as described below. FIG. 19 is a cross-sectional view of the windshield. As shown in this diagram, the camera unit 4 includes a housing 41 to be fixed to the glass sheet 1 and a camera 42 (imaging device) that is incorporated in this housing 41. The housing 41 is arranged opposite to the center mask layer 22, and an opening 43 is formed at a position that is opposite to the opening 231 of the center mask layer 22. The incorporated camera 42 takes images forward of the vehicle through the opening 43 of the housing 41 and the opening 231 of the center mask layer 22. At this time, a visual field Z (field angle) of the camera 42 is adjusted so as to be substantially coincident with the opening 231 of the center mask layer 22. An image processing device 8 is connected to the camera 42, and images taken by the camera 42 are transmitted to the image processing device 8.

This image processing device 8 can be configured by a known computer or the like. Specifically, the image processing device 8 includes a storage unit 81 such as a memory, a hard disk, and an SSD, and an image processing unit 82 configured by a CPU and the like. The image processing unit 82 virtually serves as a trimming unit 821 and an image analysis unit 822 by reading out a predetermined program from the storage unit 81 and executing the program, for example. These operations will be described later. It should be noted that the image processing device 8 may be arranged inside the camera unit 4 or outside the camera unit 4. Moreover, various pieces of information analyzed by the image analysis unit 822 are transmitted to a vehicle drive control unit and the like. For example, as described later, the distance between vehicles is calculated using taken images, and then a braking device such as a brake can be controlled based on this distance between vehicles.

Figure 20:
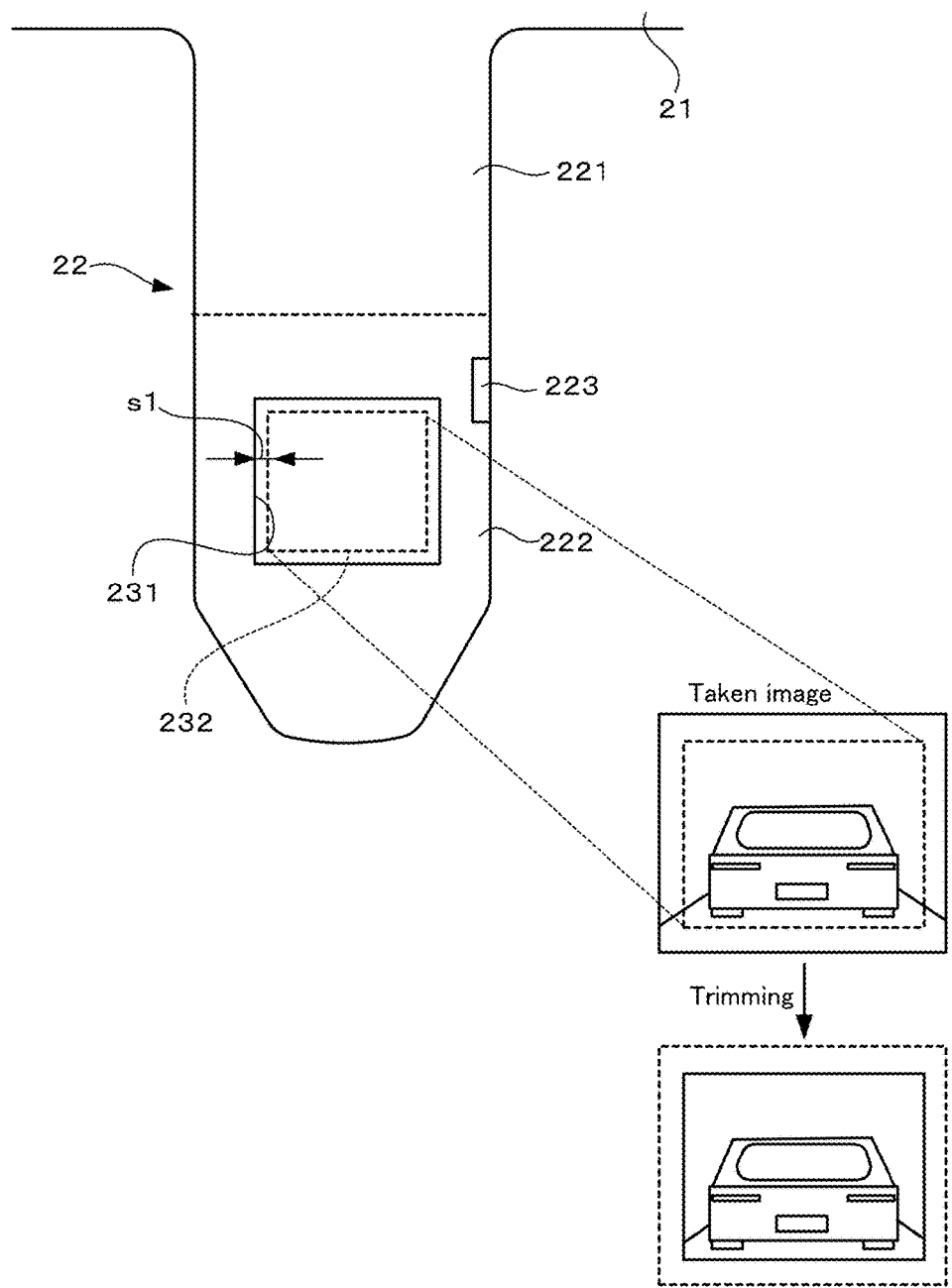
FIG. 20 is a diagram showing a relationship between an opening of a center mask layer and processing on a taken image.

Next, the operation of the camera unit 4 will be described. First, an image forward of the vehicle is taken by the camera 42. This image is transmitted to the image processing device 8 in real time. Next, the transmitted image is trimmed by the trimming unit 821 of the image processing device 8. As shown in FIG. 20, this trimming is performed on a region corresponding to a region 232 (referred to as "peripheral edge region" hereinafter) of a predetermined length at the peripheral edge of the opening 231 of the center mask layer 22. In this peripheral edge region 232, the distance s1 to the peripheral edge of the opening 231 is preferably 4 mm or more, and more preferably 6 mm or more.

The image subjected to the trimming is analyzed by the image analysis unit 822. There are various methods of image analysis. For example, a number plate of a preceding vehicle is identified, and the size of the number plate is calculated using the taken image. Then, the distance between vehicles is calculated based on the size of the number plate and the speed of the vehicle. The calculated distance between vehicles is transmitted to a drive control unit that controls a braking device as mentioned above, and a braking operation is performed as needed.

3. Features

Figure 30:
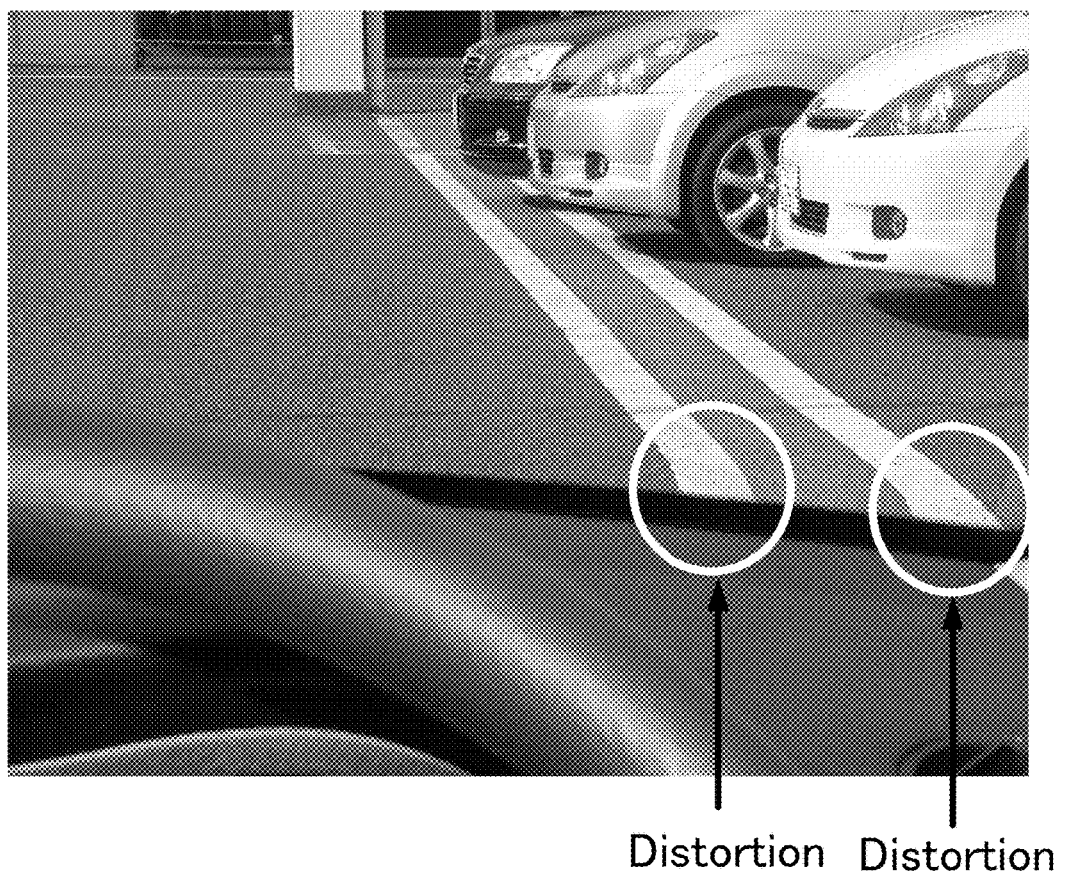
FIG. 30 is a photograph showing distortion of an image of a boundary between a mask layer and a non-mask layer.

As described above, with this embodiment, the following effects can be obtained. The mask layer 2 is formed adjacent to the glass sheet 1 as mentioned above. Thereafter, the glass sheet 1 is heated and molded. At this time, the mask layer 2 has a dark color such as black and thus absorbs a larger amount of heat in the glass sheet 1 compared with the region in which the mask layer 2 is not formed, such as the opening 231. In addition, the thermal expansion coefficient of the mask layer 2 is different from that of the glass sheet 1 as described above, and therefore, compressive stress and tensile stress occur during molding in the region in which the mask layer 2 has been formed. Moreover, distortion occurs near the boundary between the glass sheet 1 and the upper opening 231 and the boundary between the glass sheet 1 and the lower opening 232 due to the difference in the curvature of the glass surface between the outer glass sheet and the inner glass sheet. If the windshield is made of a laminated glass, and the thickness of the outer glass sheet 11 is larger than that of the inner glass sheet, the inner glass sheet 12 is more largely curved than the outer glass sheet 11 near the boundaries, and therefore, distortion is more prominent in a laminated glass constituted by glass sheets having different thicknesses. As a result, when an image as shown in FIG. 30 is taken by the camera 42 due to light being refracted due to distortion of the glass in the opening 231, there is a risk that the image cannot be accurately analyzed.

Therefore, in this embodiment, as shown in FIG. 20, a region corresponding to the peripheral edge region 232 of the opening 231 in which distortion is considered to have occurred is trimmed off from the taken image, and the remaining image is used to perform image analysis. As a result, the image analysis is performed using the image in the region in which no distortion occurs, and therefore, the image analysis can be accurately performed, and in turn, the distance between vehicles and the like can be accurately calculated.

Since the silver layer 242 is formed in the mask layer 2, it is possible to block the emission of electromagnetic waves emitted by the camera 42. This is the same as the first embodiment.

When the transmittance with respect to light such as infrared rays is taken into consideration, it is preferable to use a laminated glass having a small thickness in which the inner glass sheet 2 has a thickness of 0.6 to 2.0 mm and the outer glass sheet 1 has a thickness of 1.8 to 2.3 mm, for example. This also contributes to setting the transmittance with respect to light having a wavelength of 700 to 800 nm to 30% or more and 80% or less. Accordingly, this laminated glass can be adopted to a windshield for a safety system using a camera.

However, the smaller the thickness of the laminated glass is, the more the sound insulation performance is affected. Therefore, as mentioned above, it is preferable to set the Young's modulus of the core layer of the interlayer to 1 to 20 MPa at a frequency of 100 Hz and a temperature of 20° C. and the Young's modulus of the outer layer to 560 MPa or more at a frequency of 100 Hz and a temperature of 20° C.

C. Modified Examples

Although the embodiment of the present invention has been described above, the present invention is not limited to the above embodiment, and various modifications can be carried out without departing from the gist of the invention.

The mask layer 2 has a three-layer configuration as mentioned above, but is not limited thereto. That is, although the silver layer 242 is provided in the above embodiment in order to block electromagnetic waves, a method of providing a single layer in which silver and ceramics are mixed may be used, and another material such as copper or nickel may be laminated as long as electromagnetic waves can be blocked. Although the silver layer 242 is sandwiched between the ceramic layers so as not to be seen from the outside, a member such as the above-described cover can be used instead of covering the silver layer 242 with the ceramic layers. An electromagnetic wave blocking layer is not necessarily provided, and it is sufficient if at least a layer for concealment from the outside is formed. Furthermore, the silver layer can also be applied in order to conceal the above-described region in which distortion occurs. Moreover, the silver layer can also be formed not only on the mask layer but in the regions (regions in which distortion occurs) of smaller than or equal to the distances s1 and s2 from the peripheral edges of the openings 231 and 232. That is, the silver layer can also be formed in at least a portion of the mask layer and the regions in which distortion occurs.

The mask layer 2 may have a color other than black, and there is no particular limitation as long as the mask layer 2 has a dark color such as brown, gray, and dark blue such that a visual field from the outside of the vehicle is blocked and the vehicle interior side is concealed.

Figure 21:
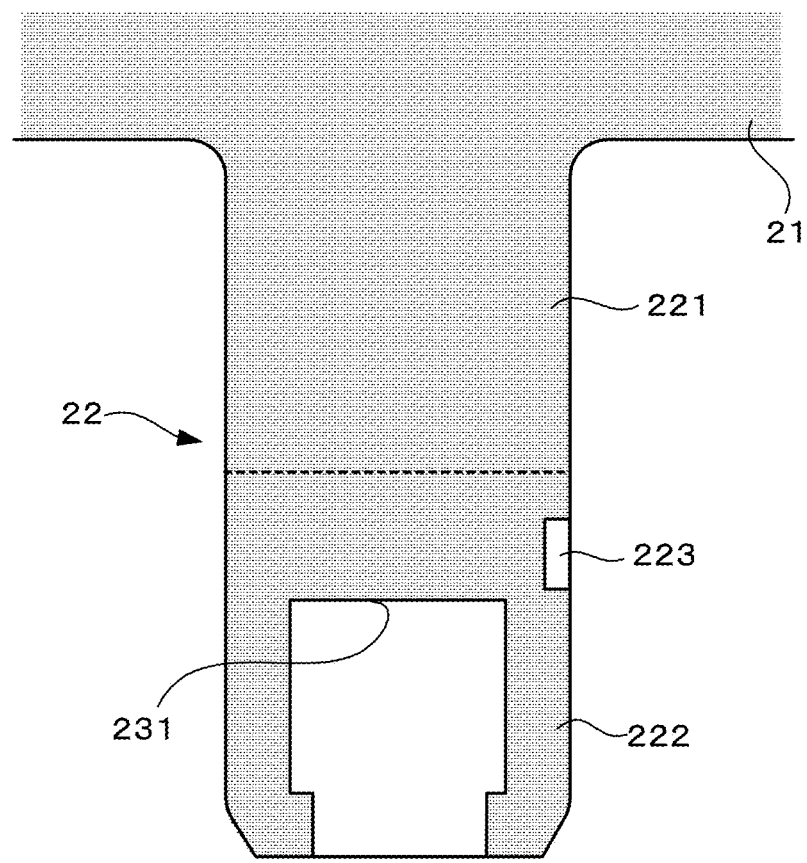
FIG. 21 is a diagram showing another example of an opening formed in a mask layer.

In the above embodiments, the opening formed in the mask layer is a closed opening that is entirely surrounded by the mask layer, but the entirety of the opening according to the present invention is not necessarily closed, and a portion may be open. As shown in FIG. 21, for example, the opening 231 whose lower side is open may be formed. There is no limitation to the lower side, and any position around the opening may also be open.

EXAMPLES

Hereinafter, examples of the present invention will be described. It should be noted that the present invention is not limited to the examples below.

1. Evaluation of Distortion at Peripheral Edge of Opening of Mask Layer

First, a glass sheet provided with a mask layer as described below was prepared.

(1) Configuration of glass sheet: A laminated glass was used that included an outer glass sheet and inner glass sheet that were made of green glass and had a thickness of 2 mm, and a single-layer interlayer that was arranged between these glass sheets.

(2) Mask layer: The composition was of that shown in Table 3 and Table 4 above. The upper opening had a longitudinal length of 58 mm and a lateral length of 72 mm, and the lower opening had a longitudinal length of 29 mm and a lateral length of 72 mm.

(3) Production of glass sheet: The first ceramic layer, the silver layer, and the second ceramic layer were formed on the surface on the vehicle interior side of the inner glass sheet by screen printing to form the mask layer. Thereafter, the glass sheet was fired at 650° C. in a heating furnace, molded into a curved shape using a mold as shown in FIG. 8, and annealed after being carried out of the heating furnace.

Figure 22:
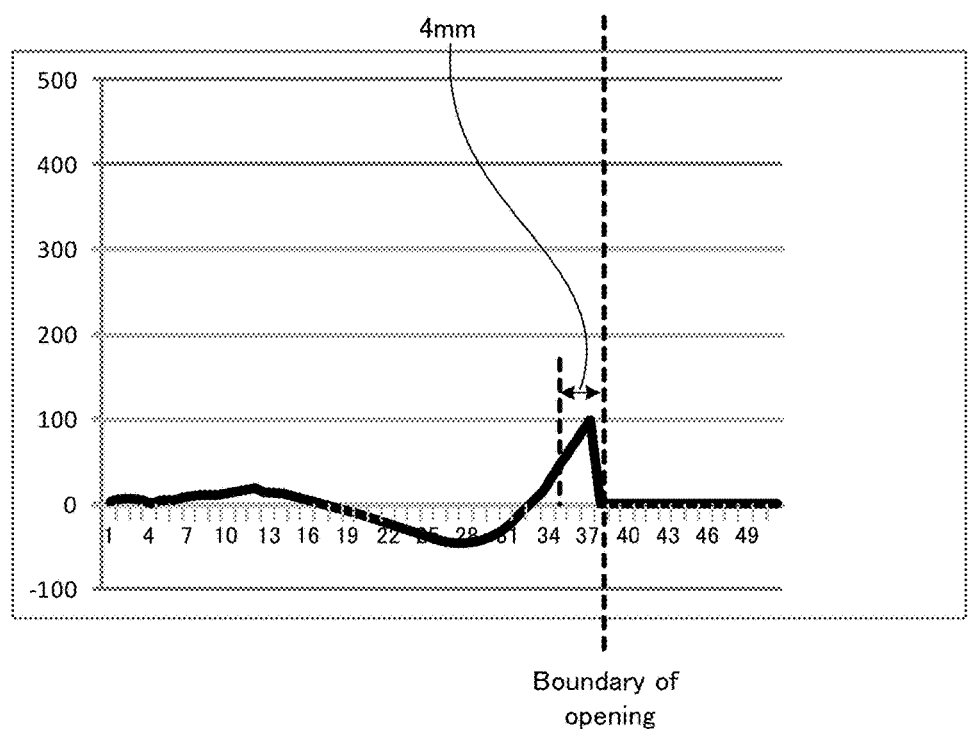
FIG. 22 is a graph showing distortion of a glass sheet.

Subsequently, with regard to the glass sheet manufactured as mentioned above, distortion of the glass sheet near the boundary of the mask layer 2 was measured. FIG. 22 shows the results. In this graph, the horizontal axis indicates the length of the glass sheet in a surface direction, and the vertical axis indicates the lens power (mili diopter: inverse of focal length). The method of measuring the lens power is as described below. First, light is projected at the glass sheet in a darkroom, and a shadow is formed on a screen behind the glass sheet. At this time, if there is a convex lens on the glass sheet, the light is condensed, and the shadow on the screen becomes bright. On the other hand, if there is a concave lens on the glass sheet, the shadow becomes dark. Here, there is a correlation between the lens power and the brightness of the shadow on the screen, and the relationship between the lens power and the brightness can be determined by placing a lens whose lens power is already known and then measuring the brightness on the screen. Accordingly, when the target glass sheet is arranged, and the brightness on the screen is measured over the entire glass sheet, the lens power of the glass sheet can be obtained.

As a result of such measurement, it can be seen from FIG. 22 that distortion increases from the mask layer toward the non-mask layer because the lens power sharply increases near the boundary therebetween. Moreover, it can be seen that distortion decreases at a position that is a predetermined length away from the boundary, and distortion disappears at a position farther away therefrom.

Figure 23:
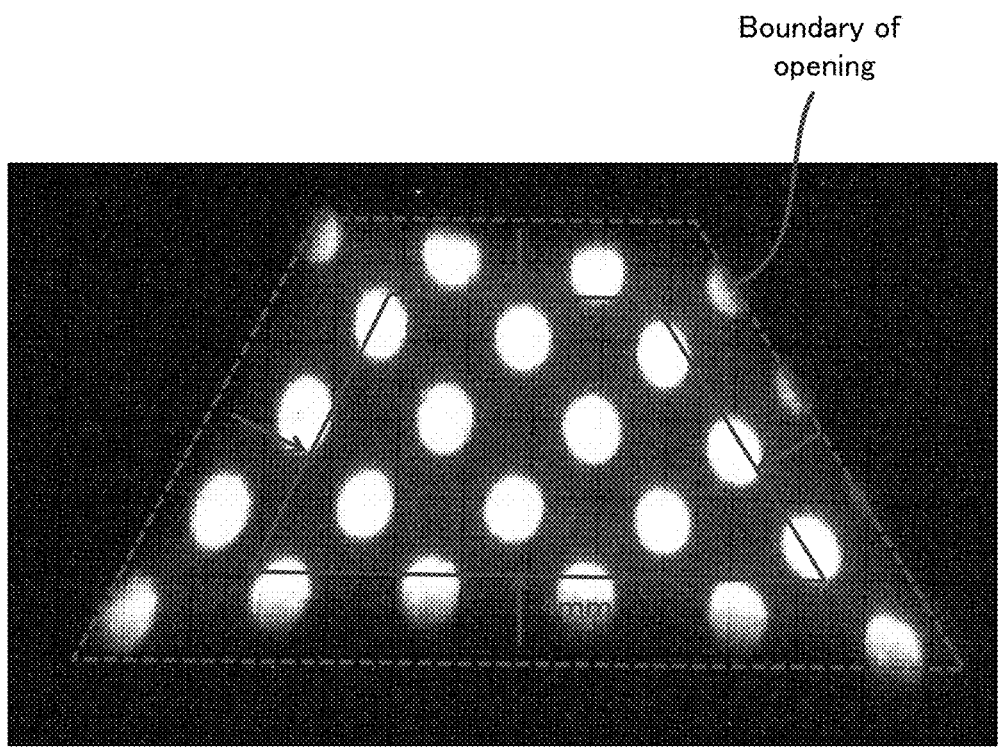
FIG. 23 is a photograph showing distortion of a glass sheet.

Moreover, the distortion of an image due to the distortion of the glass sheet was investigated. FIG. 23 shows the results. This diagram is a photograph of the glass sheet in which a trapezoidal opening had been formed in the mask layer that was taken in accordance with a transparent distortion test of JIS R3212. In this diagram, perfect circles are deformed and distorted into an elliptic shape in the peripheral edge region in a range of 4 mm or less from the boundary between the mask layer 2 and the opening. On the other hand, it can be seen that the circles near the center of the opening (region excluding the range of 4 mm from the boundary) are closer to a perfect circle compared with the circles near the boundary.

Accordingly, when an information acquisition device such as a laser radar that emits and/or receives light to acquire information from the outside of the vehicle is used, it is necessary that the passage range of emitted light and/or light to be received is not arranged in the above-described region having large distortion. Moreover, when an image is analyzed, it is necessary that a region of the taken image that corresponds to the above-described peripheral edge region is not used.

2. Evaluation with Regard to Young's Modulus of Core Layer

Laminated glasses of examples and comparative examples were prepared as listed below.

TABLE 5

| | Thickness of outer glass sheet | Thickness of inner glass sheet | Young's modulus of core layer |
|---|---|---|---|
| Ex. 1 | 2.0 mm | 1.0 mm | 20 MPa |
| Ex. 2 | 2.0 mm | 1.0 mm | 16 MPa |
| Ex. 3 | 2.0 mm | 1.0 mm | 10 MPa |
| Ex. 4 | 2.0 mm | 1.0 mm | 5 MPa |
| Comp. Ex. 1 | 1.5 mm | 1.5 mm | 40 MPa |
| Comp. Ex. 2 | 2.0 mm | 1.0 mm | 40 MPa |

Each glass sheet was made of the clear glass described above. The interlayer included a core layer and a pair of outer layers between which the core layer was sandwiched. The interlayer had a thickness of 0.76 mm, with the core layer having a thickness of 0.1 mm and each of the two outer layers having a thickness of 0.33 mm. The Young's modulus of each of the two outer layers was adjusted to 441 MPa (20° C., 100 Hz).

With respect to the examples and the comparative examples, the sound transmission loss was evaluated by simulation. The simulation conditions are as described below.

First, the simulation was performed using a piece of acoustic analysis software (ACTRAN manufactured by Free Field Technologies). This software is capable of calculating the sound transmission loss (transmitted sound pressure level/incident sound pressure level) of a laminated glass by solving the following wave equation using the finite element method.

$$\text{General wave equation} \quad \frac{\partial^2 \vec{u}}{\partial t^2} = \frac{K}{\rho} \frac{\partial^2 \vec{u}}{\partial x^2} \quad c = \sqrt{\frac{K}{\rho}} \quad \text{Formula 1}$$

$K$: bulk modulus $\rho$: density $c$: phase velocity

Next, the calculation conditions will be described.

1. Setting of Model

Figure 24:
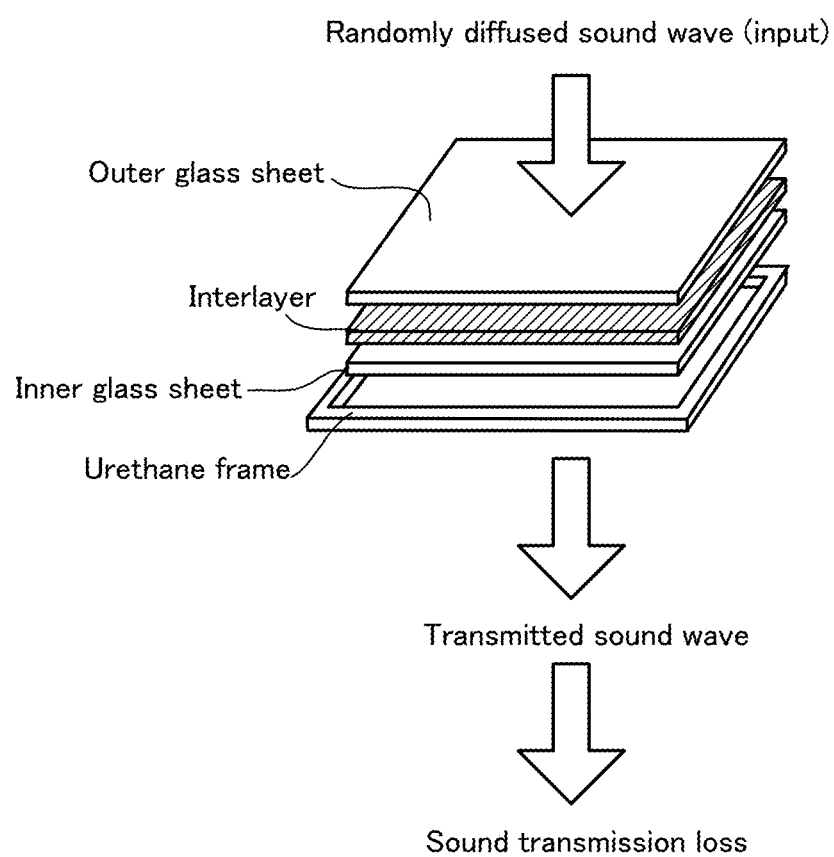
FIG. 24 is a model diagram of a simulation for outputting sound transmission loss.

FIG. 24 shows a model of the laminated glasses that were used in this simulation. This model defines a laminated glass in which an outer glass sheet, an interlayer, an inner glass sheet, and a urethane frame are stacked in this order from the sound source side. Here, the urethane frame was added to the model because the point that the presence or absence of a urethane frame is considered to have an influence in no small way on the results of calculation of the sound transmission loss and the point that a laminated glass is generally bonded with a urethane frame interposed between the laminated glass and a windshield of a vehicle were taken into account.

2. Input Conditions 1 (Dimensions Etc.)

TABLE 6

| | |
|---|---|
| Dimensions of both glass sheets | 800 × 500 mm |
| Thicknesses of both glass sheets | As described above |
| Configuration of interlayer | Three-layer structure of outer layer/core layer/outer layer |
| Thickness of interlayer | As described above |
| Constraint condition | Lower surface of urethane frame is fixed and constrained. |
| Incidence condition of sound | Randomly diffused sound wave |

It should be noted that the dimensions 800×500 mm of the glass sheets are smaller than the sizes that are used in actual vehicles. The larger the glass size, the poorer the STL value tends to be. The reason for this is that the constrained area increases with the size, and accordingly the resonance mode increases. However, even if the glass size varies, the tendency of relative values with respect to the frequency, that is, the tendency of a laminated glass made of glass sheets having different thicknesses to be inferior to a laminated glass made of glass sheets having the same thickness in a predetermined frequency band is unchanged.

The randomly diffused sound wave in Table 6 above refers to such a sound wave that a sound wave having a predetermined frequency propagates with incident angles in every direction toward the outer glass sheet, and assumes a sound source in a reverberation chamber in which the sound transmission loss is measured.

3. Input Conditions 2 (Property Values)

TABLE 7

| | Young's modulus [MPa] | Loss factor (tanδ) | Poisson's ratio | Density [Kg/m³] |
|---|---|---|---|---|
| Both glass sheets | 7160 | 0.01 to 0.02 | 0.23 | 2500 |
| Both outer layers | Shown in table below | Shown in table below | 0.49 | 1060 |
| Core layer | Shown in table below | Shown in table below | 0.49 | 1060 |
| Urethane frame | 10 | 0.01 | 0.45 | 2000 |

Regarding Young's Modulus and Loss Factor of Core Layer and Two Outer Layers

Different values were used for different main frequencies. The reason for this is that the core layer and the two outer layers are viscoelastic bodies, and therefore, the Young's moduli thereof exhibit strong frequency dependence due to the viscous effect. It should be noted that although the temperature dependence is also significant, the property values that assume a constant temperature (20° C.) were used in this simulation.

TABLE 8

| f [Hz] | E [MPa] | tanδ |
|---|---|---|
| Core layer | | |
| 100 | 19 | 1.00 |
| 125 | 20 | 1.00 |
| 160 | 21 | 1.00 |
| 200 | 22 | 1.00 |
| 250 | 23 | 1.00 |
| 315 | 24 | 1.00 |
| 400 | 25 | 1.00 |
| 500 | 26 | 1.00 |
| 630 | 27 | 1.00 |
| 800 | 28 | 1.00 |
| 1000 | 29 | 1.00 |
| 1250 | 30 | 1.00 |
| 1600 | 32 | 1.00 |
| 2000 | 33 | 1.00 |
| 2500 | 35 | 1.00 |
| 3150 | 36 | 1.00 |
| 4000 | 38 | 1.00 |
| 5000 | 40 | 1.00 |
| 6300 | 41 | 1.00 |
| 8000 | 43 | 1.00 |
| 10000 | 45 | 1.00 |
| Two outer layers | | |
| 100 | 441 | 0.26 |
| 125 | 453 | 0.25 |
| 160 | 467 | 0.24 |
| 200 | 480 | 0.23 |
| 250 | 493 | 0.23 |
| 315 | 507 | 0.22 |
| 400 | 522 | 0.22 |
| 500 | 537 | 0.21 |
| 630 | 552 | 0.21 |
| 800 | 569 | 0.21 |
| 1000 | 585 | 0.20 |
| 1250 | 601 | 0.20 |
| 1600 | 619 | 0.20 |
| 2000 | 636 | 0.20 |
| 2500 | 654 | 0.20 |
| 3150 | 673 | 0.20 |
| 4000 | 693 | 0.19 |
| 5000 | 712 | 0.19 |
| 6300 | 733 | 0.19 |
| 8000 | 754 | 0.19 |
| 10000 | 775 | 0.19 |

Figure 25:
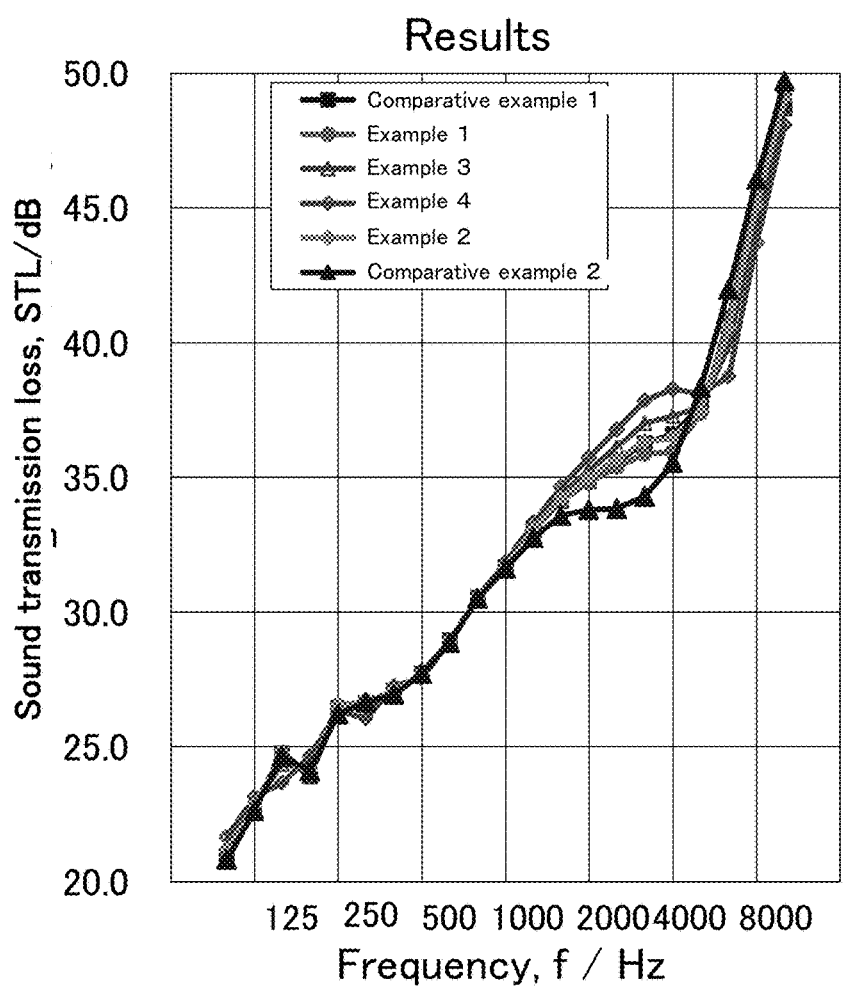
FIG. 25 is a graph showing the results of evaluation regarding Young's moduli of core layers.

The results are as shown in the graph of FIG. 25. The results show that as in Examples 1 to 4, the STL values due to the difference in thickness can be suppressed by setting the Young's modulus of the core layer to 20 MPa (20° C., 100 Hz) or less. Moreover, as in Examples 2 to 4, when the Young's modulus of the core layer is set to 16 MPa (20° C., 100 Hz) or less, the sound transmission loss in the frequency range of 2000 to 5000 Hz is higher than that of Comparative Example 1, in which the two glass plates have the same thickness. Furthermore, as in Examples 3 and 4, when the Young's modulus of the core layer is set to 10 MPa (20° C., 100 Hz) or less, the sound transmission loss in the frequency range of 2000 to 5000 Hz is clearly higher than that of Comparative Example 1, in which the two glass plates have the same thickness. Accordingly, it was found that the sound insulation performance in the frequency range of 2000 to 5000 Hz, which humans can easily hear, was increased by setting the inner glass sheet to be thinner than the outer glass sheet and setting the Young's modulus of the core layer to 20 MPa or less.

3. Evaluation with Regard to Thickness of Core Layer

Laminated glasses of examples and comparative examples were prepared as listed below. Here, the sound transmission loss was calculated using the above-described simulation method with varying thicknesses of the core layers. The interlayer included three layers, and only the thicknesses of the core layer and each of the outer layers were varied without changing the total thickness. The Young's modulus of the core layer was set to 10 MPa (20° C., 100 Hz), and the Young's modulus of each of the outer layers was set to 441 MPa (20° C., 100 Hz). Moreover, the thicknesses of the outer glass sheet and the inner glass sheet were set to 2.0 mm and 1.0 mm, respectively.

TABLE 9

| | Core layer | Outer layer | Interlayer |
|---|---|---|---|
| Ex. 5 | 0.1 mm | 0.325 mm | 0.76 mm |
| Ex. 6 | 0.2 mm | 0.28 mm | 0.76 mm |
| Ex. 7 | 0.4 mm | 0.18 mm | 0.76 mm |
| Ex. 8 | 0.6 mm | 0.08 mm | 0.76 mm |
| Comp. Ex. 3 | 0.05 mm | 0.305 mm | 0.76 mm |
| Comp. Ex. 4 | 0.01 mm | 0.375 mm | 0.76 mm |

Figure 26:
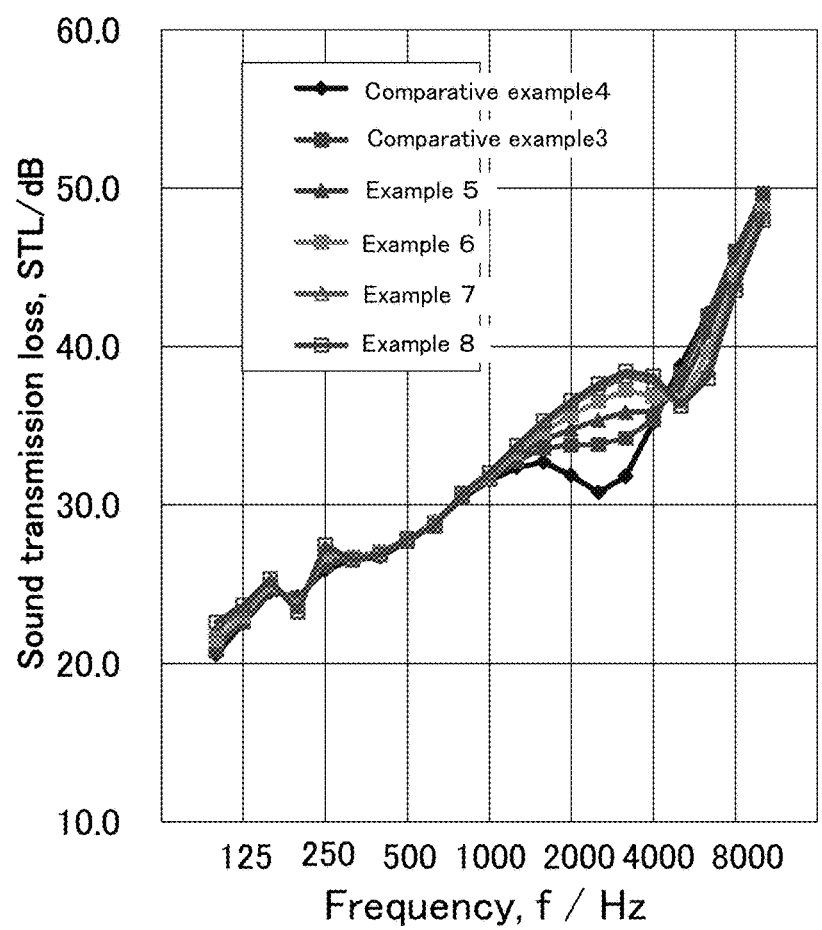
FIG. 26 is a graph showing the results of evaluation regarding thicknesses of core layers.

With respect to the above-described examples and comparative examples, the sound transmission loss was evaluated by simulation. The results are as shown in FIG. 26. This graph shows that if the core layer has a thickness of less than 0.1 mm, the sound transmission loss in the frequency range of 2000 to 5000 Hz decreases. Accordingly, in order to increase the sound insulation performance in the frequency range of 2000 to 5000 Hz, which humans can easily hear, it is preferable to set the thickness of the core layer to 0.1 mm or more.

4. Evaluation with Regard to Attachment Angle of Laminated Glass

Then, the attachment angle of a laminated glass was evaluated by simulation with varying sound incident angles. Here, the sound transmission loss was calculated while varying the angle to the vertical from 0 to 75 degrees. Each of the glass sheets was made of the clear glass described above. The interlayer included a core layer and a pair of outer layers between which the core layer was sandwiched. The thickness of the interlayer was set to 0.76 mm, with the thickness of the core layer being set to 0.1 mm and the thickness of each of the two outer layers being set to 0.33 mm. The Young's modulus of the core layer was set to 10 MPa (20° C., 100 Hz), and the Young's modulus of each of the two outer layers was set to 441 MPa (20° C., 100 Hz). The thicknesses of the glass sheets were set to 2.0 mm and 1.0 mm, respectively.

TABLE 10

| | Attachment angle |
|---|---|
| Ex. 9 | 0 degrees |
| Ex. 10 | 15 degrees |
| Ex. 11 | 30 degrees |
| Ex. 12 | 45 degrees |
| Comp. Ex. 5 | 60 degrees |
| Comp. Ex. 6 | 75 degrees |

Figure 27:
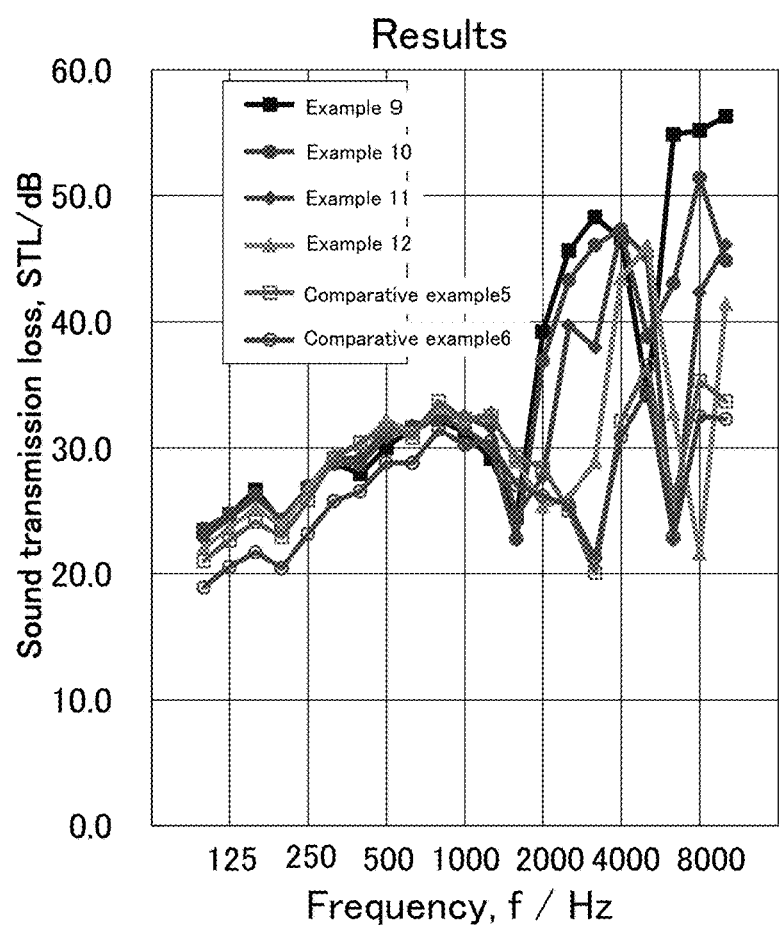
FIG. 27 is a graph showing the results of evaluation regarding attachment angles of laminated glasses.

With respect to the above-described examples and comparative examples, the sound transmission loss was evaluated using the above-described simulation method. However, the simulation was performed with the laminated glass attachment angle being added to the input conditions. The results are as shown in FIG. 27. This graph shows that at an attachment angle exceeding 60 degrees, the sound transmission loss sharply drops at a frequency around 3000 Hz. Accordingly, it was found that in order to increase the sound insulation performance in the frequency range of 2000 to 5000 Hz, which humans can easily hear, it was preferable to set the laminated glass attachment angle with respect to the vertical to 45 degrees or less. The sound insulation performance can be increased as long as the attachment angle does not exceed 60 degrees, and in some cases, it is possible to increase the sound insulation performance by setting the attachment angle at 75 degrees or less.

5. Evaluation with Regard to Young's Modulus of Outer Layer

In order to evaluate the Young's moduli of the outer layers, laminated glasses of examples and comparative examples were prepared as listed below. Here, the thicknesses of the outer glass and the inner glass were fixed, and the sound transmission loss was calculated using the above-described simulation method with varying Young's moduli of the outer layers and the core layer of the interlayer. Each of the glass sheets was made of the clear glass described above, and the interlayer included a core layer and a pair of outer layers between which the core layer was sandwiched. The thickness of the interlayer was set to 0.76 mm, with the thickness of the core layer being set to 0.1 mm and the thickness of each of the two outer layers being set to 0.33 mm.

TABLE 11

|  | Thickness of outer glass sheet | Thickness of inner glass sheet | Young's modulus of core layer | Young's modulus of outer layer |
| --- | --- | --- | --- | --- |
| Ex. 13 | 2.0 mm | 1.3 mm | 19 MPa | 441 MPa |
| Ex. 14 | 2.0 mm | 1.3 mm | 19 MPa | 882 MPa |
| Ex. 15 | 2.0 mm | 1.3 mm | 9.5 MPa | 441 MPa |
| Ex. 16 | 2.0 mm | 1.3 mm | 9.5 MPa | 882 MPa |
| Ex. 17 | 2.0 mm | 1.3 mm | 9.5 MPa | 1764 MPa |
| Ex. 18 | 2.0 mm | 1.3 mm | 9.5 MPa | 3528 MPa |

Figure 28:
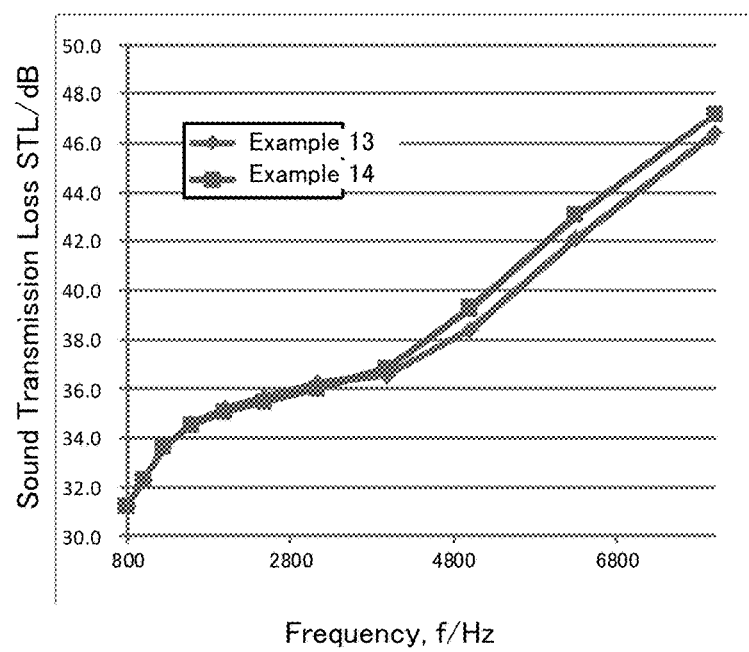
FIG. 28 is a graph showing the results of evaluation regarding Young's moduli of outer layers.

The results are as described below. First, FIG. 28 shows the results of Examples 13 and 14. According to the above-described evaluation with regard to the Young's modulus of the core layer, it was found that if the Young's modulus was set at 20 MPa or less, the sound transmission loss in the frequency range of 2000 to 5000 Hz, which humans can easily hear, was high. In contrast, in Examples 13 and 14, the Young's modulus of the core layer was fixed, and the Young's modulus of the outer layers was varied. As a result, as shown in FIG. 28, it was found that in Example 14 in which the outer layers had a high Young's modulus, the sound transmission loss was increased in a high frequency range of 5000 Hz or more.

Figure 29:
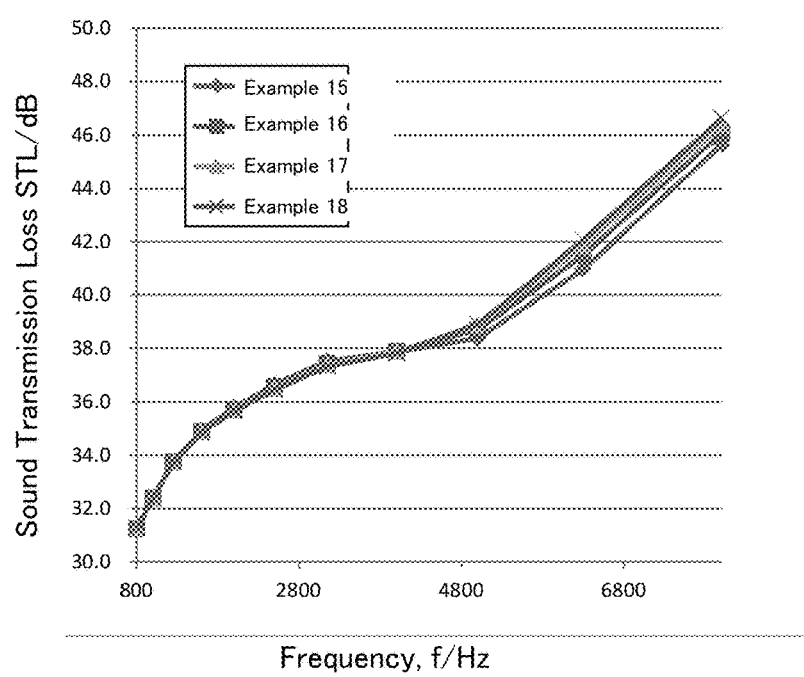
FIG. 29 is a graph showing the results of evaluation regarding Young's moduli of outer layers.

Moreover, in Examples 15 to 18, the Young's modulus of the core layer is lowered even further, and the Young's moduli of the outer layers are increased. As shown in FIG. 29, in these examples, the sound transmission loss in the frequency range of 2000 to 5000 Hz is higher than that of Examples 13 and 14, but the sound transmission loss in the high frequency range of 5000 Hz or higher is not as high as that of Examples 13 and 14. In particular, when the Young's modulus of the outer layers exceeds 1764 MPa, the sound transmission loss in the high frequency range of 5000 Hz or higher is little increased.

REFERENCE SIGNS LIST

1 Glass sheet
2 Mask layer
22 Center mask layer
241 First ceramic layer (first visual field blocking film)
242 Silver layer (electromagnetic wave blocking film)
243 Second ceramic layer (second visual field blocking film)
42 Camera (imaging device)
5 Sensor (information acquisition device)

The invention claimed is:

1. A windshield to which an information acquisition device can be attached that emits and/or receives light to acquire image information from outside of a vehicle that includes the windshield, the windshield comprising:
  a glass sheet;
  a mask layer that is formed on the glass sheet and blocks a visual field and visible light from the outside of the vehicle, at least one opening being formed in the mask layer,
  wherein the glass sheet and the mask layer have different heat shrinkage percentages and are molded together by being heated, and
  the information acquisition device is configured such that the image information can be used such that an influence of distortion is reduced, the distortion occurring in a predetermined range from an inner peripheral edge of the opening toward a center of the opening due to the molding.

2. The windshield according to claim 1, wherein
  a passage range of the light to be emitted and/or to be received is configured so as to pass through near a center of the opening, and
  the information acquisition device is arranged on a surface of the glass sheet on a vehicle interior side so as to be capable of acquiring the information through the opening.

3. The windshield according to claim 2, wherein the passage range of the light is spaced apart from the peripheral edge of the opening by at least 4 mm.

4. The windshield according to claim 2, wherein at least a portion of the mask layer is black.

5. The windshield according to claim 2, wherein an electromagnetic wave blocking film is formed in at least a portion of a region to which the information acquisition device is to be attached in at least a portion of the mask layer and a region in which distortion occurs.

6. The windshield according to claim 5, wherein at least a portion of the mask layer and the region in which distortion occurs can be configured by arranging a first visual field blocking film, the electromagnetic wave blocking film, and a second visual field blocking film in this order from a vehicle exterior side to a vehicle interior side.

7. The windshield according to claim 1, wherein the information acquisition device includes:
  an imaging device that is arranged on a vehicle interior side of the glass sheet so as to be capable of taking an image of an outside of the vehicle through the opening; and
  an image processing device that processes the image taken by the imaging device,
  wherein the image processing device is configured to analyze the image taken by the imaging device through the opening without using a region corresponding to the predetermined range.

8. The windshield according to claim 7, wherein the region is a region corresponding to a range of 4 mm or more from the peripheral edge of the opening toward a center of the opening.

9. The windshield according to claim 7, wherein the image processing device trims off the region from the image and analyzes the image subjected to the trimming.

10. The windshield according to claim 7, wherein at least a portion of the mask layer is black.

11. The windshield according to claim 7, wherein the glass sheet includes an outer glass sheet, an inner glass sheet that is arranged opposite to the outer glass sheet, and an interlayer arranged between the outer glass sheet and the inner glass sheet.

12. The windshield according to claim 11, wherein the interlayer includes a core layer, and a pair of outer layers that have a higher hardness than that of the core layer and between which the core layer is sandwiched.

13. The windshield according to claim 12, wherein the core layer has a Young's modulus of 1 to 20 MPa at a frequency of 100 Hz and a temperature of 20° C.

14. The windshield according to claim 12, wherein the outer layers have a Young's modulus of 560 MPa or more at a frequency of 100 Hz and a temperature of 20° C.

15. The windshield according to claim 7, wherein an electromagnetic wave blocking film is formed in at least a portion of a region to which the imaging device is to be attached in the mask layer.

16. The windshield according to claim 15, wherein at least a portion of the mask layer is configured by arranging a first visual field blocking film, the electromagnetic wave blocking film, and a second visual field blocking film in this order from a vehicle exterior side to a vehicle interior side.

\* \* \* \* \*